(12) United States Patent
Sohn et al.

(10) Patent No.: US 10,191,933 B2
(45) Date of Patent: Jan. 29, 2019

(54) SYSTEM FOR MANAGING IFC VERSION SYNCHRONIZED WITH BIM AND METHOD FOR MANAGING IFC VERSION THEREOF

(71) Applicant: SEOKYOUNG SYSTEMS, Seoul (KR)

(72) Inventors: Young Seok Sohn, Guri-si (KR); Sang Deok Choi, Seongnam-si (KR)

(73) Assignee: SEOKYOUNG SYSTEMS, Seoul (KR)

( * ) Notice: Subject to any disclaimer, the term of this patent is extended or adjusted under 35 U.S.C. 154(b) by 681 days.

(21) Appl. No.: 14/761,296

(22) PCT Filed: Jan. 16, 2013

(86) PCT No.: PCT/KR2013/000338
§ 371 (c)(1),
(2) Date: Sep. 7, 2015

(87) PCT Pub. No.: WO2014/112662
PCT Pub. Date: Jul. 24, 2014

(65) Prior Publication Data
US 2015/0379063 A1    Dec. 31, 2015

(30) Foreign Application Priority Data

Jan. 15, 2013 (KR) .......................... 10-2013-0004536
Jan. 15, 2013 (KR) .......................... 10-2013-0004537

(51) Int. Cl.
*G06F 17/30* (2006.01)
*G06Q 10/10* (2012.01)
*G06Q 50/08* (2012.01)

(52) U.S. Cl.
CPC .... *G06F 17/30368* (2013.01); *G06F 17/3023* (2013.01); *G06F 17/30082* (2013.01);
(Continued)

(58) Field of Classification Search
CPC ......... G06F 17/30368; G06F 17/30082; G06F 17/30174; G06F 17/3023; G06F 17/30217; G06Q 10/10; G06Q 50/08
See application file for complete search history.

(56) References Cited

U.S. PATENT DOCUMENTS 5,806,078 A * 9/1998 Hug .................... G06F 17/2288
707/999.202
8,145,600 B1 * 3/2012 Lewis ............... G06F 17/30011
707/638
(Continued)

FOREIGN PATENT DOCUMENTS

KR    10-2010-0020060 A    2/2010
KR    10-2011-0058021 A    6/2011

OTHER PUBLICATIONS

U.S General Services Administration, "GSA BIM Guide Series 02", May 1, 2007 http://www.gsa.gov/graphics/pbs/BIM_Guide_Series_02_v096.pdf See 1.1 Why spatial Program Validation; 1.2 The Spatial Program BIM Requirement; 1.4.3 Required BIM Objects & Properties; 1.4.5 Retaining Original Global Unique Identifiers; 2.1 Spaces; 2.1.2 GSA BIM Area; 4.1.1 Using IFC BIMs to Measure GSA spaces.

(Continued)

*Primary Examiner* — Boris Gorney
*Assistant Examiner* — Tiffany Thuy Bui
(74) *Attorney, Agent, or Firm* — Park, Kim & Suh, LLC

(57) ABSTRACT

The present invention relates to a system for managing IFC versions by comparing two or more IFC files produced with a time interval therebetween so as to trace the alteration history, and to a method for managing the IFC file version thereof. A system for managing the IFC versions includes: a comparison target processing unit for acquiring first IFC file attribute information concerning a first IFC file and second IFC file attribute information concerning at least one second (Continued)

IFC file; a GUID comparison engine for comparing a first IFC file GUID set containing first IFC GUIDs with a second IFC file GUID set containing second IFC GUIDs; and a spatial object comparison engine for comparing a first IFC file spatial object information set containing first IFC file spatial objects with a second IFC file spatial object information set containing second IFC file spatial objects.

33 Claims, 14 Drawing Sheets

(52) U.S. Cl.
CPC .. *G06F 17/30174* (2013.01); *G06F 17/30271* (2013.01); *G06Q 10/10* (2013.01); *G06Q 50/08* (2013.01)

(56) References Cited

U.S. PATENT DOCUMENTS

| | | | |
|---|---|---|---|
| 8,352,218 B2* | 1/2013 | Balla | G06F 17/5004 345/419 |
| 9,408,561 B2* | 8/2016 | Stone | A61B 5/112 |
| 2006/0044307 A1* | 3/2006 | Song | G06Q 10/06 345/419 |
| 2010/0281384 A1* | 11/2010 | Lyons | G06F 3/048 715/723 |
| 2011/0307281 A1* | 12/2011 | Creveling | G06Q 10/063 705/7.11 |
| 2012/0128205 A1* | 5/2012 | Lee | G06K 9/00671 382/103 |
| 2012/0239886 A1* | 9/2012 | Rantanen | G06F 17/30368 711/147 |
| 2012/0259594 A1 | 10/2012 | Khan et al. | |
| 2013/0144566 A1* | 6/2013 | De Biswas | G06T 17/005 703/1 |
| 2014/0095973 A1* | 4/2014 | Chu | G06F 17/2288 715/229 |
| 2014/0249779 A1* | 9/2014 | Cheung | G06F 17/50 703/1 |

OTHER PUBLICATIONS

Park, Young-Sup, "A Study on Development of the Spatial Network Analysis Tool based on Open BIM Technologies", The Journal of Society of CAD/CAM Engineers, vol. 17, No. 1, Feb. 2012, pp. 7-16 See pp. 7-10.

International Search Report in International Application No. PCT/KR2013/000338, dated Jul. 26, 2013.

* cited by examiner

SYSTEM FOR MANAGING IFC VERSION SYNCHRONIZED WITH BIM AND METHOD FOR MANAGING IFC VERSION THEREOF

CROSS-REFERENCE TO RELATED APPLICATIONS

This application is the National Stage filing under 35 U.S.C. 371 of International Application No. PCT/KR2013/000338, filed on Jan. 16, 2013, which claims the benefits of Korean Patent Application No. 10-2013-0004536, filed on Jan. 15, 2013 and Korean Patent Application No. 10-2013-004537, filed on Jan. 15, 2013, the contents of which are all hereby incorporated by reference herein in their entirety.

TECHNICAL FIELD

The present invention generally relates to an IFC version management system and an IFC version management method for the system. More particularly, the present invention relates to an IFC version management system and an IFC version management method for the system, which may track and compare the modification histories of IFC files by comparing two or more IFC files generated with a time interval therebetween.

BACKGROUND ART

Information sharing and exchange between application tools used in the construction industry are long-term objects of relevant researchers. To this end, Industry Foundation Classes (IFC), which is a standard data model, has been developed by Building Smart International and applied to practical applications. Building objects are defined by Building Information Modeling (BIM) to represent the real world in a virtual CAD environment, and BIM objects are converted into IFC object model instances. Consequently, BIM, which is based on IFC, may be defined as a new concept for exchanging BIM data between BIM platforms.

During the process of construction design, there may be multiple changes to an initial plan over time. Whenever any change occurs, the IFC file may be separately saved, and the saved IFC file may become a different version of the IFC file. The different versions of the IFC files may be visually displayed through software such as Autodesk Revit, ArchiCAD, Digital Project, and the like.

Meanwhile, when there are different versions of IFC files, it is necessary to detect or control the changes in the IFC files. For the different versions of IFC files, conventional methods control the changes by indicating the versions in file names or by writing memos in the files used with Autodesk Revit, ArchiCAD, Digital Project, and the like. When the versions are expressed in the file names, it is impossible to detect and compare information about the changes beyond the change in the version or the text information included in the file name. Also, when a user of an authoring tool, such as Autodesk Revit, ArchiCAD, Digital Project, and the like, writes details about changes, such details may be omitted. Particularly, when multiple users collaborate using such tools, there is a high probability of omissions and mistakes (including miscommunication) in tracking the changes. Also, when the changes occur over multiple objects, it is difficult to directly extract, compare, and control the changes for each of the IFC versions. Furthermore, because the size of the IFC file is very large (the size ranges from dozens of megabytes to gigabytes and beyond) and the structure thereof is very complicated, visually tracking the changes in the IFC files is almost impossible.

On the other hand, IFC has an enormous number of objects. Accordingly, when changes are tracked based on each of the objects, extracting and comparing the changes for each of the IFC versions is very difficult and inefficient due to the IFC file size and the number of objects. Also, even if the object information (including the object attribute information) included in the IFC files is stored in a DB, version comparison targeting all the objects may cause a decline in both efficiency and speed due to the problem of a huge number of objects.

DISCLOSURE

Technical Problem

An object of the present invention is to provide an IFC version management system.

Another object of the present invention is to provide an information processing method related to the IFC version management system.

Technical Solution

In order to accomplish the above objects, the present invention provides an information processing method of an IFC version management system, which includes: (A) obtaining first IFC file attribute information related to a first IFC file and second IFC file attribute information related to at least one second IFC file; (B) checking a change in a GUID set comprising GUID information included in the first IFC file and the second IFC file; and (C) checking a change in a spatial object information set comprising at least one piece of spatial object information included in the first IFC file and the second IFC file.

For a first IFC file GUID set comprising GUIDs included in the first IFC file and a second IFC file GUID set comprising GUIDs included in the second IFC file, step (B) may be configured to extract a GUID, which is not included in the second IFC file GUID set but in the first IFC file GUID set, or to extract a GUID, which is not included in the first IFC file GUID set but in the second IFC file GUID set.

Step (C) comprises checking a change in any one or more of an area and a volume of a spatial object, for at least one first IFC file spatial object included in the first IFC file and at least one second IFC file spatial object included in the second IFC file, wherein the change may be checked between the first IFC file spatial object and the second IFC file spatial object when the GUID of the first IFC file spatial object is identical to the GUID of the second IFC file spatial object.

Step (C) comprises checking a change in a relationship of a spatial object, for at least one first IFC file spatial object included in the first IFC file and at least one second IFC file spatial object included in the second IFC file, wherein the change may be checked between the first IFC file spatial object and the second IFC file spatial object when the GUID of the first IFC file spatial object is identical to the GUID of the second IFC file spatial object.

Step (C) comprises checking a change in a location of a spatial object, for at least one first IFC file spatial object included in the first IFC file and at least one second IFC file spatial object included in the second IFC file, and the change may be checked between the first IFC file spatial object and the second IFC file spatial object when the GUID of the first IFC file spatial object is identical to the GUID of the second IFC file spatial object.

The first IFC file attribute information may be generated by extracting attribute information, which is distinguished from graphic data, from the first IFC file, and the second IFC file attribute information may be generated by extracting attribute information, which is distinguished from graphic data, from the second IFC file.

Before step (A), the information processing method of the IFC version management system may further include (D) obtaining both information about a selection of the first IFC file or an equivalent of the first IFC file and information about a selection of the second IFC file or an equivalent of the second IFC file from a user of the IFC version management system.

Before step (D), the information processing method of the IFC version management system may further include (E) providing information about two or more of the IFC files or two or more of the equivalents of the IFC files to a terminal of the user of the IFC version management system, wherein the information about the two or more of the IFC files or the two or more of the equivalents of the IFC files may be presented according to a time sequence.

After step (C), the information processing method of the IFC version management system may further include (F) generating comparison information before and after a change in any one among an area, a volume, a relationship, and a location of a spatial object, for the spatial object for which change information is generated.

Whether IfcSpace exists in IfcSpatialStructureElement, corresponding to the first IFC file spatial object and the second IFC file spatial object, is checked, and the area or volume of the spatial object may be calculated only when IfcSpace exists in the IfcSpatialStructureElement.

For each of the first IFC file spatial object and the second IFC file spatial object, if the area and volume of the spatial object are defined in IfcElementQuantity, the area may be obtained from IfcQuantityArea and the volume may be obtained from IfcQuantityVolume, and if not, the area and volume may be calculated depending on whether the spatial object has a 2D form or a 3D form.

When the spatial object has a 2D form, the area and volume may be calculated using information of IfcPolyLine defined in IfcShapeRepresentation, and when the spatial object has a 3D form, the area and volume may be calculated using information of IfcExtrudedAreaSolid and information of IfcPolyLine, defined in IfcShapeRepresentation.

When the area and volume of the spatial object are not defined in IfcElementQuantity and the spatial object has neither a 2D form nor a 3D form and when the area and volume of the spatial object are defined in B-REP form, the area and volume may be calculated using information of IfcSurfaceIfLinearExtrusion and information of IfcPolyLine, defined in IfcRelSpaceBoundary.

Checking the change in the relationship of the spatial object may comprise obtaining at least one first related object set, related to the first IFC file spatial object, obtaining at least one second related object set, related to the second IFC file spatial object, and comparing whether the first related object set is identical to the second related object set.

A first related object of the first related object set may be an object included in relationship information of the first IFC file spatial object, and a second related object of the second related object set may be an object included in relationship information of the second IFC file spatial object.

Whether X, Y, and Z coordinates of the first IFC file spatial object are identical to X, Y, and Z coordinates of the second IFC file spatial object may be determined by checking IfcLocalplacement and IfcAxis2Placement of the first IFC file spatial object and the second IFC file spatial object.

In step (C), for at least one first IFC file spatial object included in the first IFC file and at least one second IFC file spatial object included in the second IFC file, checking a change in any one or more of an area and volume of the spatial object, checking a change in a relationship of the spatial object, and checking a change in a location of the spatial object are sequentially performed, wherein all the changes may be checked between the first IFC file spatial object and the second IFC file spatial object when the GUID of the first IFC file spatial object is identical to the GUID of the second IFC file spatial object.

Step (A) may be configured to perform any one or more of a first IFC file attribute information obtaining method and a second IFC file attribute information obtaining method, the first IFC file attribute information obtaining method obtaining attribute information directly from the first IFC file and the second IFC file, and the second IFC file attribute information obtaining method obtaining the attribute information from an attribute information DB in which the attribute information extracted from the first IFC file and the second IFC file is stored.

Checking the change in the relationship of the spatial object may comprise obtaining at least one first related object, related to the first IFC file spatial object, obtaining at least one second related object, related to the second IFC file spatial object, and comparing whether an attribute of the first related object is identical to an attribute of the second related object.

When the number of IFC files having different versions, processed by the IFC version management system, is n (where n is an integer equal to or greater than 2), a past IFC file becomes the first IFC file based on an IFC file generation date and a remaining IFC file becomes the second IFC file, among two IFC files having different versions, which are selected from among n files, and step (A), (B), and (C) are performed for respective cases of nC2 combinations for selecting two files from among n files.

In order to accomplish the above objects, the present invention provides an IFC version management system including: a comparison target processing unit for obtaining first IFC file attribute information related to a first IFC file and second IFC file attribute information related to at least one second IFC file; a GUID comparison engine for comparing a first IFC file GUID set comprising first IFC file GUIDs of first IFC file attributes with a second IFC file GUID set comprising second IFC file GUIDs of second IFC file attributes, the first IFC file attributes and the second IFC file attributes being obtained by the comparison target processing unit; and a spatial object comparison engine for comparing a first IFC file spatial object information set comprising information of a first IFC file spatial object of the first IFC file attributes with a second IFC file spatial object information set comprising information of a second file spatial object of the second IFC file attributes, the first IFC file attributes and the second IFC file attributes being obtained by the comparison target processing unit.

The GUID comparison engine may extract a GUID, which is not included in the second IFC file GUID set but in the first IFC file GUID set, or extract a GUID, which is not included in the first IFC file GUID set but in the second IFC file GUID set.

The spatial object comparison engine includes an area-volume comparison engine, and for one or more of the first IFC file spatial objects and the second IFC file spatial objects, of which the GUIDs are the same, the area-volume comparison engine may compare whether an area or volume in the first IFC file is identical to an area or volume in the second IFC The spatial object comparison engine includes a relationship comparison engine, and for one or more of the first IFC file spatial objects and the second IFC file spatial objects, of which the GUIDs are the same, the relationship comparison engine may compare whether an object set related to the first IFC file spatial object is identical to an object set related to the second IFC file spatial object.

The spatial object comparison engine includes a location comparison engine, and for one or more of the first IFC file spatial objects and the second IFC file spatial objects, of which the GUIDs are the same, the location comparison engine may compare whether location information of the first IFC file spatial object is identical to location information of the second IFC file spatial object.

The first IFC file attribute information may be generated by extracting attribute information, which is distinguished from graphic data, from the first IFC file, and the second IFC file attribute information may be generated by extracting attribute information, which is distinguished from graphic data, from the second IFC file.

The comparison target processing unit includes a comparison target obtaining unit, and the comparison target obtaining unit includes a designated target obtaining unit for obtaining both information about a selection of the first IFC file or an equivalent of the first IFC file and information about a selection of the second IFC file or an equivalent of the second IFC file from a user of the IFC version management system.

The comparison target obtaining unit may further include a comparison target transmission unit for providing information about two or more of the IFC files or two or more of the equivalents of the IFC files to a terminal of the user of the IFC version management system, and the information about the two or more of the IFC files or the two or more of the equivalents of the IFC files may be presented according to a time sequence.

The IFC version management system may further include a comparison information output unit, and the comparison information output unit may generate comparison information before and after a change in any one among an area, a volume, a relationship, and a location of a spatial object, for the spatial object for which change information is generated.

The spatial object comparison engine may include a spatial object checking engine, and the spatial object checking engine may check whether IfcSpace exists in IfcSpatialStructureElement corresponding to the first IFC file spatial object and the second IFC file spatial object. Also, information processing of the spatial object checking engine may be performed for the first IFC file spatial object and the second IFC file spatial object only when IfcSpace exists in the IfcSpatialStructureElement.

The spatial object comparison engine may include an area-volume comparison engine, and for each of the first IFC file spatial object and the second IFC file spatial object, the area-volume comparison engine may respectively obtain an area and a volume from IfcQuantityArea and IfcQuantityVolume if the area and volume of the spatial object are defined in IfcElementQuantity, and calculate the area and volume depending on whether the spatial object has a 2D form or a 3D form if the area and volume of the spatial object are not defined in IfcElementQuantity.

When the spatial object has a 2D form, the area and volume may be calculated using information of IfcPolyLine defined in IfcShapeRepresentation, and if the spatial object has a 3D form, the area and volume may be calculated using information of IfcExtrudedAreaSolid and information of IfcPolyLine, defined in IfcShapeRepresentation.

When the area and volume of the spatial object are not defined in IfcElementQuantity and the spatial object has neither a 2D form nor a 3D form and when the area and volume of the spatial object are defined in B-REP form, the area and volume may be calculated using information of IfcSurfaceOfLinearExtrusion and information of IfcPolyLine, defined in IfcRelSpaceBoundary.

Checking a change in the relationship of the spatial object may comprise obtaining at least one first related object set, related to the first IFC file spatial object, obtaining at least one second related object set, related to the second IFC file spatial object, and comparing whether the first related object set is identical to the second related object set.

A first related object of the first related object set may be an object included in relationship information of the first IFC file spatial object, and a second related object of the second related object set may be an object included in relationship information of the second IFC file spatial object.

Whether X, Y, and Z coordinates of the first IFC file spatial object are identical to X, Y, and Z coordinates of the second IFC file spatial object may be determined by checking IfcLocalplacement and IfcAxis2Placement of the first IFC file spatial object and the second IFC file spatial object.

For at least one first IFC file spatial object included in the first IFC file and at least one second IFC file spatial object included in the second IFC file, the spatial object comparison engine may sequentially perform checking a change in any one or more of an area and volume of the spatial object, checking a change in a relationship of the spatial object, and checking a change in a location of the spatial object. Also, all the changes may be checked between the first IFC file spatial object and the second IFC file spatial object when the GUID of the first IFC file spatial object is identical to the GUID of the second IFC file spatial object.

The comparison target processing unit may obtain attribute information directly from the first IFC file and the second IFC file, or obtain the attribute information from an attribute information DB in which the attribute information extracted from the first IFC file and the second IFC file is stored.

The relationship comparison engine may check the change in the relationship of the spatial object through processes of obtaining at least one first related object, related to the first IFC file spatial object, obtaining at least one second related object, related to the second IFC file spatial object, and comparing whether an attribute of the first related object is identical to an attribute of the second related object.

When the number of IFC files having different versions, processed by the IFC version management system, is n (where n is an integer equal to or greater than 2), a past IFC file becomes the first IFC file based on an IFC file generation date and a remaining IFC file becomes the second IFC file, among two IFC files having different versions, selected from among n files, and information processing of the GUID comparison engine and the spatial object comparison engine is performed for respective cases of nC2 combinations for selecting two files from among n files.

Advantageous Effects

When the present invention is applied, the following effects are expected.

First, changes in an IFC file that is a target of comparison may be quickly and systematically recognized.

Second, changes in data corresponding to an IFC file may be quickly and systematically recognized, wherein the data stores attribute information extracted from the IFC file that is a target of comparison.

Third, because changes are compared only for spatial objects in an IFC file, which stores information about a huge number of objects, the speed of comparison may be dramatically improved.

Fourth, it is possible to systematically prevent problems in modification information management, which may easily occur in IFC version management, such as conventional version management through file names and through memos in authoring tools.

Fifth, an IFC version management service may be provided to users.

BEST MODE

Figure 1:
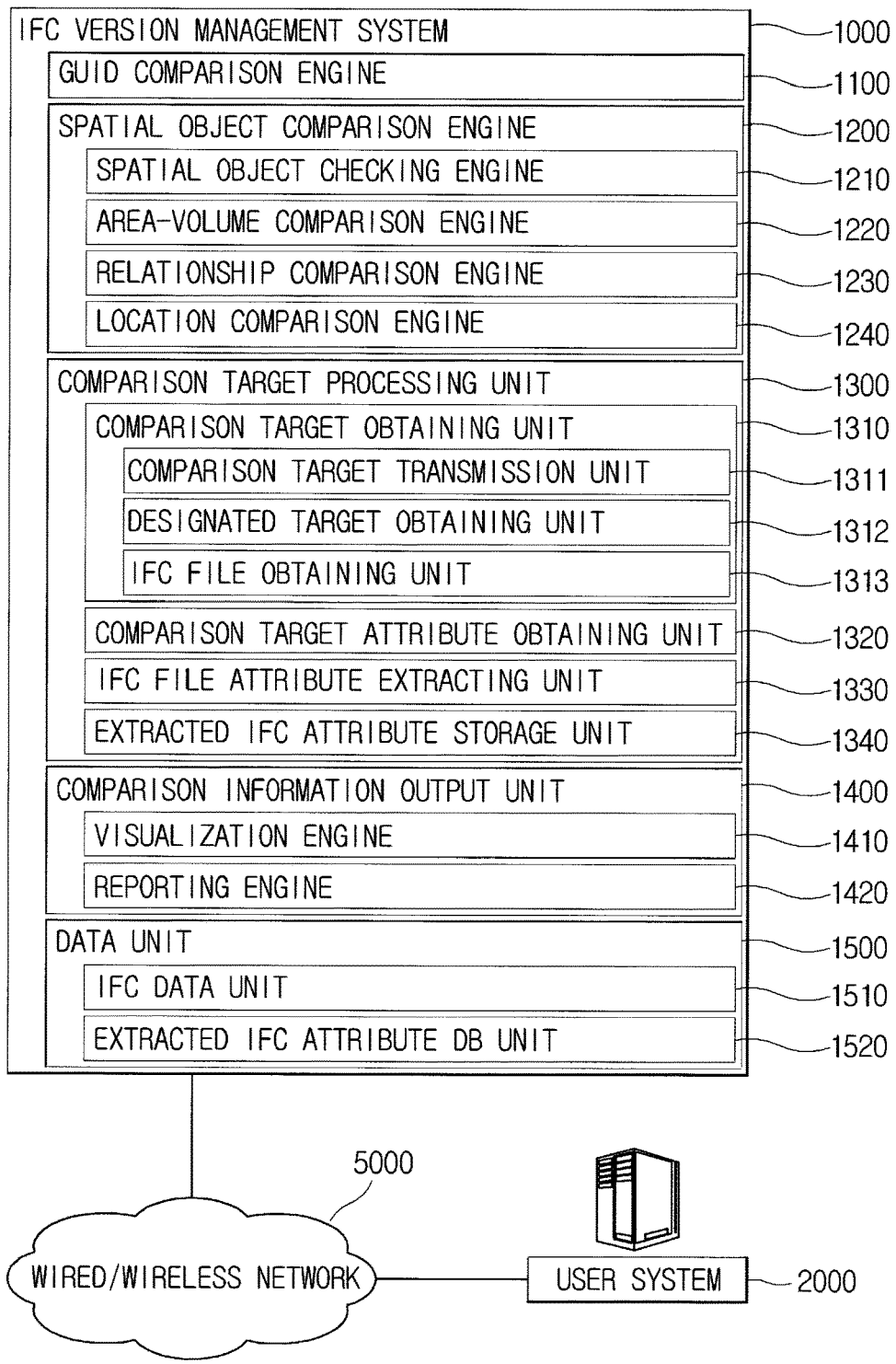
FIG. 1 is a view illustrating an exemplary embodiment of the configuration of an IFC version management system of the present invention.
Figure 2:
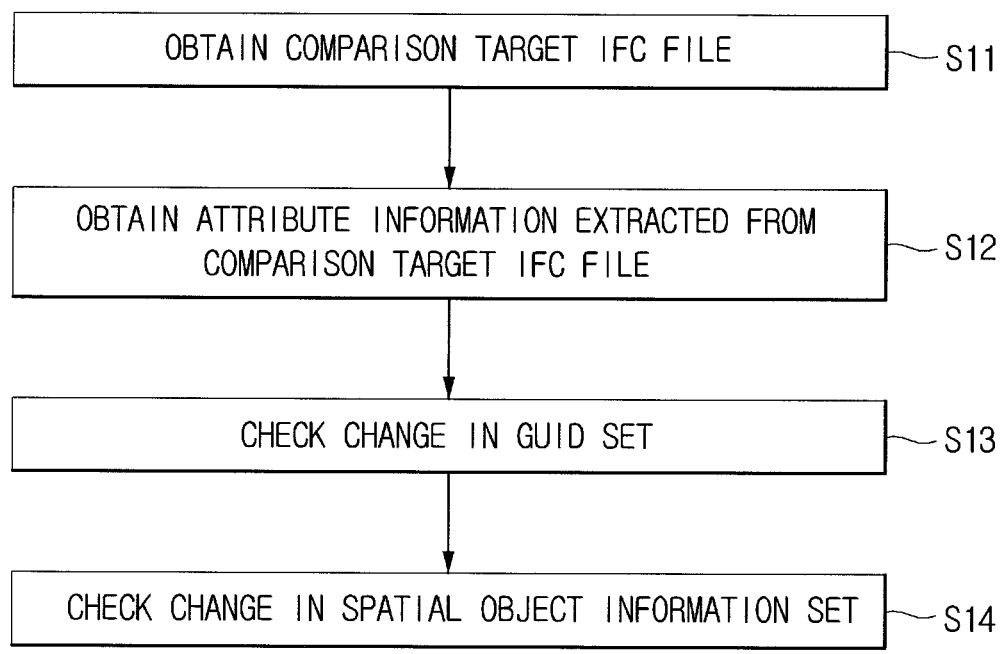
FIG. 2 is a view illustrating an exemplary embodiment of the information processing method of an IFC version management system of the present invention.

When objects (a wall, a door, a window, a slab, and the like) are stored in an IFC file format using BIM software, a unique GUID is assigned to all of the objects. "GUID" is an acronym for "Globally Unique IDentifier", and is a pseudo-random number used in application software. When a GUID is generated, it is not guaranteed that the GUID has a unique value. However, because the available number of GUIDs is $2^{128} = 3.4028 \ast 10^{38}$, there is little possibility that the same GUID will be generated if a proper algorithm is provided. As mentioned above, a newly generated object is assigned a unique GUID, which is not a duplicate of that of another object. The following drawing shows a GUID assigned to a wall object. The IFC file format may be displayed in various pieces of BIM software, and may also be displayed in text format using a text editor such as NotePad.

The following is an example of the header structure of an IFC data file.

ISO-10303-21;
HEADER;
FILE_DESCRIPTION(('IFC 2x'),'2;1');
FILE_NAME('wall_layers_number_1','2005-11-18T19:49:00',('IFC Tester'),('IFC test'),'IFC test','','');
FILE_SCHEMA(('IFC2X3'));
ENDSEC;

As shown in the above header part, the header part of an IFC data file includes information about a standard number, a description, a file name, a schema, and the like.

The following is an example of the IFC object definition in an exemplary IFC data file.

DATA;
1=IFCSIUNIT(*,.TIMEUNIT.$,.SECOND.);
2=IFCSIUNIT(*,.MASSUNIT.,$,.GRAM.);
3=IFCSIUNIT(*,.LENGTHUNIT.,$,.METRE.);
4=IFCSIUNIT(*,.AREAUNIT.$,.SQUARE_METRE.);
5=IFCSIUNIT(*,.VOLUMEUNIT.$,.CUBIC_METRE.);
6=IFCUNITASSIGNMENT((#3,#4,#5,#1,#2));
7=IFCCARTESIANPOINT((0.,0.,0.));
8=IFCDIRECTION((0.,0.,1.));
9=IFCDIRECTION((1.,0.,0.));
10=IFCAXIS2PLACEMENT3D(#7,#8,#9);
11=IFCGEOMETRICREPRESENTATIONCONTEXT(TestGeometricContext,'Mode I',3,0.,#10,$);
12=IFCPERSON('','','',$,$,$,$,$);
13=IFCORGANIZATION('','','',$,$);
14=IFCPERSONANDORGANIZATION(#12,#13,$);
15=IFCAPPLICATION(#13,'IFC test','IFC test','');
16=IFCOWNERHISTORY(#14,#15,$,.ADDED.,0,$,$,1137515750);
17=IFCPROJECT('OPT_Q094H9v8b_eikESoe8',#16,'DefaultProject','Automatically generated project',$,$,$,(#11),#6);
23=IFCBUILDING('3NCvGOKI1AzQy43aQeYrm2',#16,'DefaultBuilding','Automatically generated building',$,#22,$,$,.ELEMENT.,$,$,$);
30=IFCPROPERTYSINGLEVALUE('Layername',$,IFCLABEL('IfcBuildingStorey'),$);
31=IFCPROPERTYSINGLEVALUE('Red',$,IFCINTEGER(0),$);

32=IFCPROPERTYSINGLEVALUE('Green',$,IF-CINTERGER(0),$);
713=IFCRELAGGREGATES
('0V9Aykyu9DH8bcw$mDyfoe',#16,$,$,#23,(#29));
714=IFCRELAGGREGATES
('0DXYol0Vf2JuQfh2ain2ho',#16,$,$,#17,(#23));
ENDSEC;
END-ISO-10303-21;

In the process of building design, the size of an IFC file is very large, ranging from dozens of megabytes to gigabytes. Also, the number of lines in the IFC file may range from hundreds of thousands to over one million.

Such an IFC file has an enormous number of objects, and each of the objects has a GUID. In the exemplary IFC data file described above, '3NCvGOKI1AzQy43aQeYrm2' at line #23 is an example of a GUID.

The IFC file attribute extraction unit 1330 of the present invention extracts various objects and their attributes from an IFC file. Because the various objects have a number of references in the IFC file, a high degree of skill is required in order to systematically parse the IFC file without omissions. Particularly, extraction of objects related to a specific spatial object requires advanced information processing technology because the number of objects and spatial objects is very large in proportion to the size of the IFC file. The extracted IFC attribute storage unit 1340 of the present invention stores the extracted objects and object attributes in an extracted IFC attribute DB unit 1520.

Hereinafter, the present invention will be described in detail with reference to the drawings.

As exemplified in FIG. 1, an IFC version management system 1000 of the present invention may be connected to a user system through a wired or wireless network. The IFC version management system 1000 includes a GUID comparison engine 1100, a spatial object comparison engine 1200, a comparison target processing unit 1300 for processing a file, which is a target of comparison, by IFC version, a comparison information output unit 1400 for generating comparison information, and a data unit 1500 for storing various data.

In order to compare files according to IFC version, two or more of different versions of an IFC file must be obtained. Obtaining the IFC files to be compared is performed by the comparison target obtaining unit 1310 of the present invention. There are three methods for enabling the comparison target obtaining unit 1310 to obtain the IFC files to be compared.

The first method is a method in which two or more IFC files to be compared are uploaded from a user system (a user terminal may be an example of the user system). An IFC file obtaining unit 1313 of the present invention obtains the two or more IFC files to be compared, the files being uploaded from the user system. The uploaded IFC files are stored in an IFC data unit 1510.

The second method is performed by the processes of transmitting information about the IFC files that have been previously uploaded or have been stored in the IFC version management system 1000 to the user system, obtaining selection information from the user system, and performing predetermined comparison information processing for the selected IFC files. When the IFC version management system 1000 transmits IFC file equivalents corresponding to respective IFC versions (A, A1, A1-1, etc. indicate the IFC file equivalents, and there is one-to-one correspondence between the equivalents and the IFC files) to the user system through the UI shown in FIG. 13, the user system selects two or more files to be compared, and information about the selected IFC file equivalents is transmitted to the IFC version management system 1000. In this case, it is assumed that the IFC file corresponding to the IFC file equivalent exists in the user system, or that the information obtained by parsing the IFC file has been stored in the extracted IFC attribute DB unit 1520. Here, a comparison target transmission unit 1311 in the comparison target obtaining unit 1310 of the present invention transmits the information about the IFC file, which has been previously uploaded or has been stored in the IFC version management system 1000, to the user system, and a designated target obtaining unit 1312 obtains information about selection of the two or more IFC file equivalents to be compared from the user system.

Figure 13:
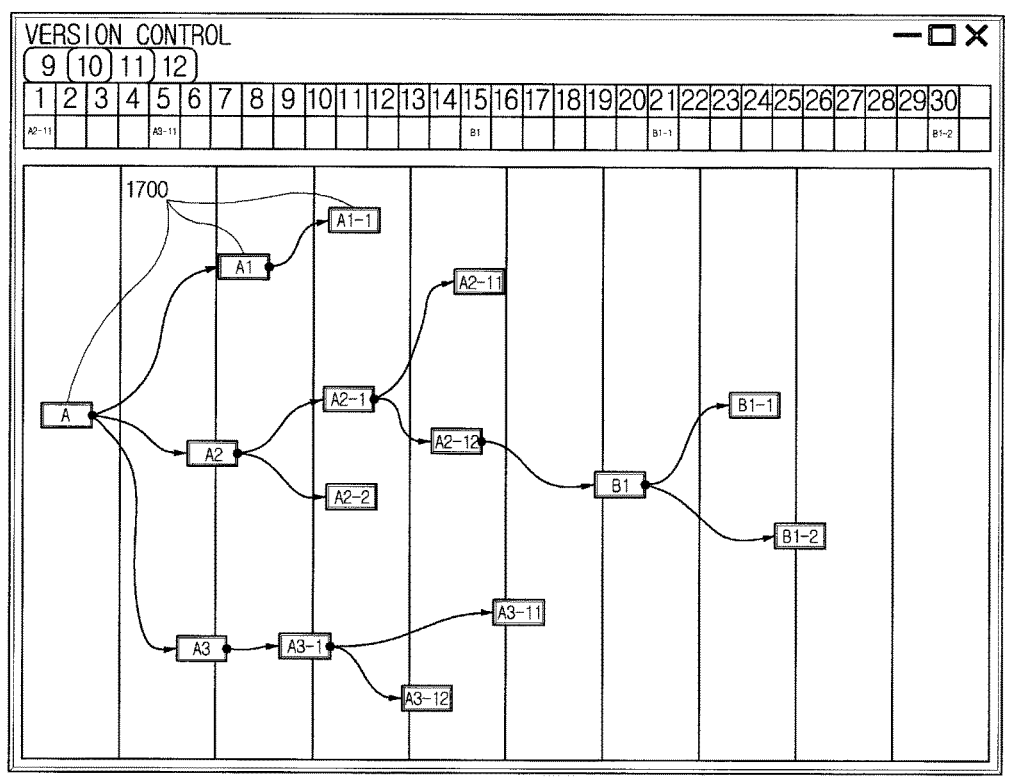
FIG. 13 is a view illustrating an exemplary embodiment of a user interface (UI) in which the equivalent of an IFC file is displayed for selection of a IFC version to be compared, the equivalent of the IFC file being provided to a user system by an IFC version management system of the present invention.

The third method is a method in which the IFC version management system 1000 recognizes an IFC file by version, which will be compared, by being operated in conjunction with an authoring tool. The IFC version management system 1000 may have the version of the IFC file, which corresponds to the IFC file equivalent, due to it being uploaded from the user system in advance, or alternatively may make the version of the IFC file be uploaded in real time. Also, the IFC version management system 1000 may be operated in conjunction with an authoring tool. Here, the version of the IFC file, which is generated and managed by the authoring tool, is displayed in the authoring tool, as shown in FIG. 13, and a user is allowed to select two or more versions of the IFC files in the UI as shown in FIG. 13 to generate comparison information for the IFC versions. In this case, the authoring tool may transmit the IFC files corresponding to the selected IFC file equivalents to the IFC version management system 1000. Meanwhile, when the authoring tool is closely interconnected with the IFC version management system 1000, even if the authoring tool has previously transmitted the IFC file generated by itself to the IFC version management system 1000, the authoring tool provides the user with the UI shown in FIG. 13. Then, when the user selects two or more of the IFC file equivalents to be compared, the authoring tool transmits the information about the selection to the IFC version management system 1000, whereby the IFC file version management system 1000 may recognize the target IFC files that the user wants to compare.

Meanwhile, the user system may comprise three kinds of user systems.

First, there is a user system, which is either used independently by the IFC version management system 1000 or used within the IFC version management system 1000. In this case, the user system may upload an IFC file to the IFC version management system 1000, generate comparison information by version for the IFC file that exists in the IFC version management system 1000, or generate comparison information for IFC files by version using information stored in the extracted IFC attribute DB unit 1520.

Second, there is a user system for the case in which the IFC version management system 1000 provides many external users with a service for generating comparison information for different versions of the IFC files over a wired or wireless network. In this case, each user system transmits the IFC file owned by itself to the IFC version management system 1000. Accordingly, the IFC version management system 1000 may generate comparison information for the received IFC file, or may extract attributes from the received IFC file by parsing the IFC file, store the attributes in the extracted IFC attribute DB unit 1520, and generate comparison information for the stored IFC attributes.

Third, a tool for generating or managing an IFC file, such as an authoring tool, may be an example of the user system.

The comparison target processing unit 1300 of the present invention may include a comparison target obtaining unit 1310, a comparison target attribute obtaining unit 1320, an IFC file attribute extraction unit 1330, and an extracted IFC attribute storage unit 1340. The IFC file attribute extraction unit 1330 extracts attributes by parsing the IFC file, which is uploaded or transmitted to the IFC version management system 1000, and the extracted IFC attribute storage unit stores the extracted attributes in the extracted IFC attribute DB unit 1520. When the comparison target attribute obtaining unit 1320 has information about the IFC file equivalents to be compared, it obtains necessary information about the attributes of the IFC files to be compared from the extracted IFC attribute DB unit 1520 in which the attributes extracted from the IFC file corresponding to the IFC file equivalent are stored.

When there are two comparison targets, the past file is an old version of the IFC file and the latest one is a new version of the IFC file. The old version of the IFC file may be called a first IFC file, and the new version of the IFC file may be called a second IFC file. The present invention allows three comparison targets, and in this case, those skilled in the art will appreciate that the comparison of the three targets may be processed through the comparison of two targets. When comparison is necessary or when the user of the IFC version management system 1000 wants to make a comparison, if the number of targets to be compared is n (where n is an integer equal to or greater than 2), the number of cases for performing the comparison between two targets becomes nC2. Accordingly, although the present invention is described with reference to the case of comparing two targets, those skilled in the art may understand that the idea of the present invention may be applied to the case in which n targets are compared.

Subsequently, the information processing method of the IFC version management system 1000 of the present invention will be described in detail with reference to the drawings.

A huge number and variety of objects exists in an IFC file, and each of the objects has multiple pieces of corresponding attribute information. Also, there are many cases in which a specific object has one or more predetermined relationships with other objects. When any one of the objects, the attributes of the objects, and the relationship between a certain object and another object is changed, the IFC file becomes another IFC file, which is different from the previous IFC file. In this case, tracking the changes for all of the objects may cause inefficiency and waste of time and expense in consideration of the IFC file size and the number of objects. Therefore, an intelligent access strategy and method are required for comparing the versions of the IFC files.

The present invention effectively accomplishes the comparison of the versions of IFC files through two steps. The first step only compares GUIDs to check the generation or deletion of objects, and this step is performed by the GUID comparison engine 1100 of the present invention. The second step compares only spatial objects rather than comparing the attributes and relationships of all the objects. This step is performed by the spatial object comparison engine 1200 of the present invention. Specifically, because the number of spatial objects is much lower than the number of all objects, it is possible to significantly reduce the number of objects to be compared through the second step, in which spatial objects and objects linked to the spatial objects are compared, whereby effective comparison of versions may be achieved for the IFC file system and structure.

Figure 3:
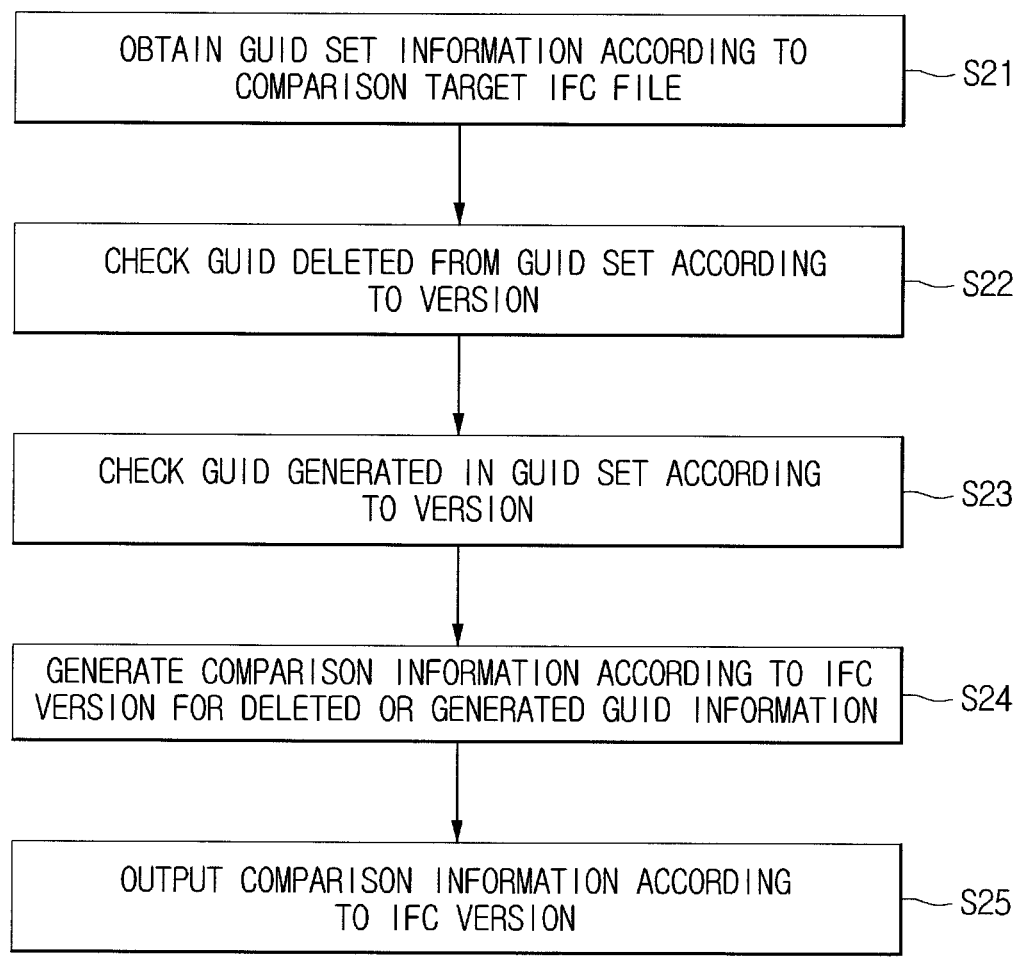
FIG. 3 is a view illustrating an exemplary embodiment of the information processing method of a GUID comparison engine of the present invention.

As illustrated in FIG. 3, the GUID comparison engine 1100 of the IFC version management system 1000 of the present invention performs comparison of GUIDs for the IFC files, which are the target of the comparison.

The following Table 1 shows one example of information about the objects extracted from the old version of the IFC file. The objects may include spatial objects. The information shown in Table 1 may become the attribute information of the old version of the IFC file.

TABLE 1

| GUID | Type | AREA ($m^2$) | VOLUME ($m^3$) | LOCATION | RELATIONS |
| --- | --- | --- | --- | --- | --- |
| GUID-01 | IfcWallStandardcase | 25.00 | 67.50 | X = 11315.7, Y = 855.12, Z = 457.2 | |
| GUID-03 | IfcWallStandardcase | 27.56 | 74.41 | X = 2387.6, Y = 5791.2, Z = 2032.0 | |
| GUID-04 | IfcWallStandardcase | 58.29 | 157.38 | X = 254.4, Y = 4267.2, Z = 1624.0 | |
| GUID-07 | IfcSpace | 76.30 | 206.01 | X = 13716.0, Y = 1218.94, Z = −355.6 | IfcDoor, IfcWindows, IfcWallStandardcase |
| GUID-10 | IfcWallStandardcase | 17.64 | 47.63 | X = 12801.6, Y = 1219.27, Z = −50.8 | |

The following Table 2 shows one example of information about the objects extracted from the new version of the IFC file. The objects may include spatial objects. Here, the object of GUID-07 is a spatial object. Also, in Table 2, the type, area, volume, location, and relationships, related to the spatial object GUID-07, correspond to spatial object information. The set having one or more pieces of spatial object information becomes a spatial object information set.

TABLE 2

| GUID | Type | AREA (m²) | VOLUME (m³) | LOCATION | RELATIONS |
|---|---|---|---|---|---|
| GUID-01 | IfcWallStandardcase | 25.00 | 67.50 | X = 11315.7, Y = 855.12, Z = 457.2 | |
| GUID-04 | IfcWallStandardcase | 27.56 | 74.41 | X = 2387.6, Y = 5791.2, Z = 2032.0 | |
| GUID-05 | IfcWallStandardcase | 58.29 | 157.38 | X = 254.4, Y = 4267.2, Z = 1624.0 | |
| GUID-07 | IfcSpace | 76.30 | 206.01 | X = 13716.0, Y = 1218.94, Z = −355.6 | IfcDoor IfcWallStandardcase |
| GUID-10 | IfcWallStandardcase | 17.64 | 47.63 | X = 12801.6, Y = 1219.27, Z = −50.8 | |

An example of the information processing method in which the GUID comparison engine 1100 of the present invention compares the GUID extracted from the old version of the IFC file with the GUID extracted from the new version of the IFC file is illustrated in FIG. 3.

The GUID comparison engine 1100 obtains information about a GUID set according to the IFC file version, which is the comparison target, at step S21, checks the GUIDs removed from the GUID set according to the version at step S22, checks the GUIDs generated in the GUID set according to the version at step S23, generates comparison information according to the IFC version at step S24, and outputs the comparison information according to the IFC version at step S25.

Table 3 shows the object information data of the old version of the IFC file, and Table 4 is an example of the object information data of the new version of the IFC file.

TABLE 3

| GUID | Object Type |
|---|---|
| GUID-01 | IfcWallStandardcase |
| GUID-03 | IfcWallStandardcase |
| GUID-04 | IfcWallStandardcase |
| GUID-07 | IfcSpace |
| GUID-10 | IfcWallStandardcase |

TABLE 4

| GUID | Object Type |
|---|---|
| GUID-01 | IfcWallStandardcase |
| GUID-04 | IfcWallStandardcase |
| GUID-05 | IfcWallStandardcase |
| GUID-07 | IfcSpace |
| GUID-10 | IfcWallStandardcase |

The GUID comparison engine 1100 generates information indicating that the GUID-03 object in the old version of the IFC file has been deleted and the GUID-05 object has been added, by comparing only the GUIDs in the data in the above Table 3 and 4, or the GUIDs in the data in Tables 1 to 2, and Tables 3 to 4.

Figure 4:
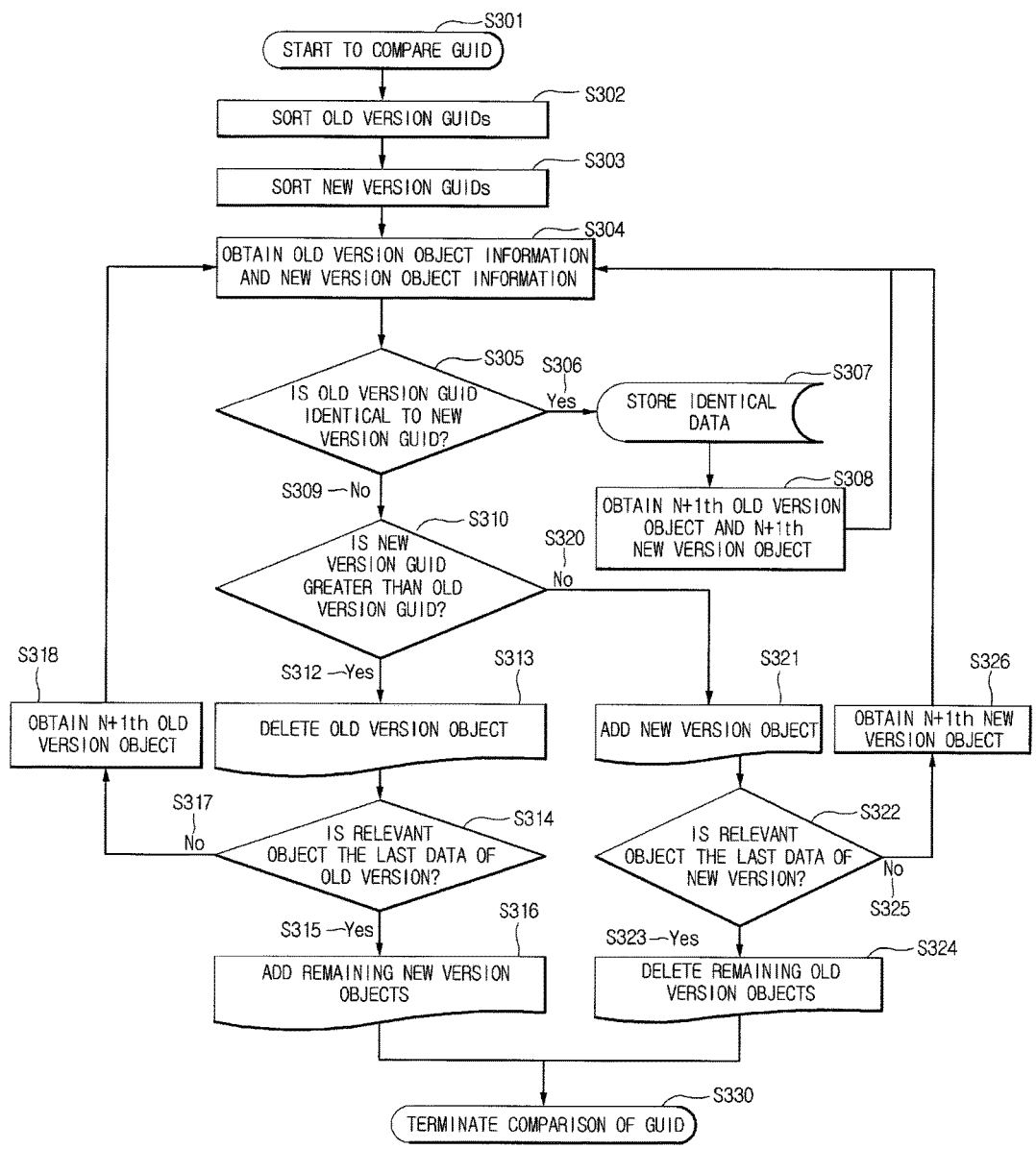
FIG. 4 is a view illustrating another exemplary embodiment of the information processing method of a GUID comparison engine of the present invention.

FIG. 4 shows an example of the method in which the GUID comparison engine 1100 of the present invention extracts deleted GUIDs or newly added GUIDs by comparing the GUIDs extracted from the old version of the IFC file with the GUIDs extracted from the new version of the IFC file. When the comparison of the GUIDs is started at step S301, the GUID comparison engine 1100 sorts the GUIDs in the old version of the IFC file at step S302, and sorts the GUIDs in the new version of the IFC file at step S303. Subsequently, the GUID comparison engine 1100 obtains object information of the old version of the IFC file and object information of the new version of the IFC file at step S304, and checks whether the GUID in the old version of the IFC file is identical to the GUID in the new version of the IFC file at step S305. When the two GUIDs are the same (S306), the same data is stored at step S307, and step S304 is performed for the (N+1)th object of the old version of the IFC file and the (N+1)th object of the new version of the IFC file. As the result of step S305, when the GUID in the old version of the IFC file is not identical to the GUID in the new version of the IFC file (S309), whether the GUID in the new version of the IFC file is greater than the GUID in the old version of the IFC file is checked at step S310. When the GUID in the new version of the IFC file is not greater than the GUID in the old version of the IFC file (S320), a new object is added according to the new version IFC and whether the object is the last data in the new version of the IFC file is checked at step S322. When the object is found to be the last data in the new version of the IFC file (S323), the remaining objects in the old version of the IFC file are deleted at step S324. As the result of step S322, if the object is found not to be the last data in the new version of the IFC file (S325), step S304 is performed for the (N+1)th GUID in the new version of the IFC file. As the result of step S310, if the GUID in the new version is greater than the GUID in the old version (S312), the object of the old version is deleted, and whether the object is the last data in the old version of the IFC file is checked at step S314. If the object is found not to be the last data in the old version of the IFC file (S317), the (N+1)th GUID in the old version is obtained at step S318, and step S304 is performed for the (N+1)th GUID. If the object is found to be the last data in the old version of the IFC file (S315), the remaining objects in the new version are added. After this process has been performed for all GUIDs, the GUID comparison is terminated at step S330.

The following Table 5 shows an example of GUID comparison information processing corresponding to the information processing method of FIG. 4.

TABLE 5

| Old-Index increment | New-Index increment | OLD GUID | NEW GUID | Comparison state | Result |
|---|---|---|---|---|---|
| 0 | 0 | GUID-01 | GUID-01 | GUID-01 = GUID-01 | Same |
| 1 | 1 | GUID-03 | GUID-04 | GUID-03 < GUID-04 | Delete GUID-03 |
| 2 | 1 | GUID-04 | GUID-04 | GUID-04 = GUID-04 | Same |
| 3 | 2 | GUID-07 | GUID-05 | GUID-07 > GUID-05 | Add GUID-05 |
| 3 | 3 | GUID-07 | GUID-07 | GUID-07 = GUID-07 | Same |
| 4 | 4 | GUID-10 | GUID-10 | GUID-10 = GUID-10 | Same |

As the first phase, the GUID comparison engine 1100 compares the unique GUIDs assigned to respective objects. First, the two versions of IFC files are separated into an old version and a new version. Then, the GUIDs are sorted for each version and compared to check whether there is a change in the GUIDs. Even if the length and shape of the object are changed, the unique GUID is not changed. Because the GUID is generated or deleted only when an object is added or deleted, the change in the GUIDs is checked, and the relevant object is found in the first phase.

As described above, the GUID comparison engine 1100 of the present invention extracts information about changes in the GUID sets respectively corresponding to the old version of the IFC file and the new version of the IFC file. The information about the changes corresponds to the deletion of GUID-03 in the old version of the IFC file and the addition (generation) of GUID-05 in the new version of the IFC file.

Subsequently, the information processing method of the spatial object comparison engine 1200 of the present invention will be described in detail with reference to FIG. 5.

Figure 5:
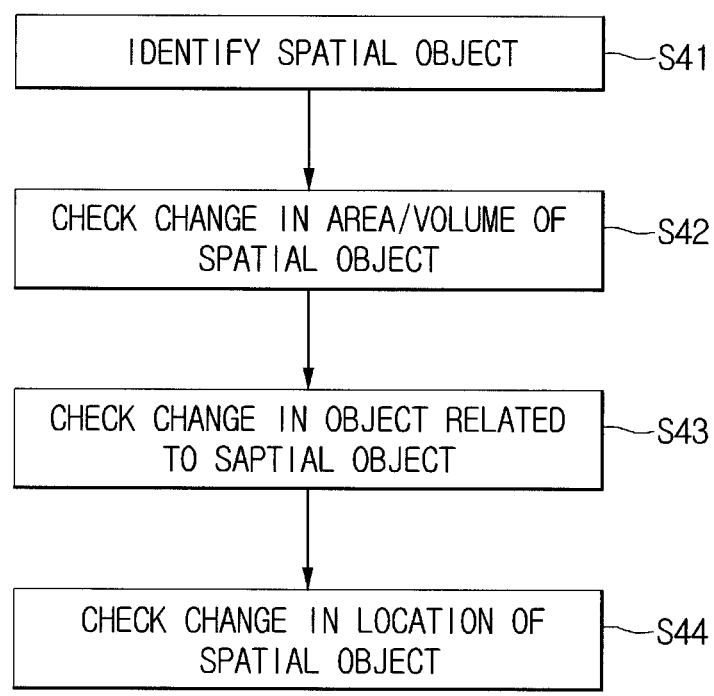
FIG. 5 is a view illustrating an exemplary embodiment of the information processing method of a spatial object comparison engine of the present invention.

FIG. 5 is a view illustrating an exemplary embodiment of the information processing method of the spatial object comparison engine 1200.

The spatial object comparison engine 1200 identifies a spatial object at step S41. Then, the spatial object comparison engine 1200 sequentially or non-sequentially performs one or more of a step for checking the change in the area/volume of the spatial object (S42), a step for checking the change in objects related to the spatial object (S43), and a step for checking the change in the location of the spatial object (S44).

Figure 6:
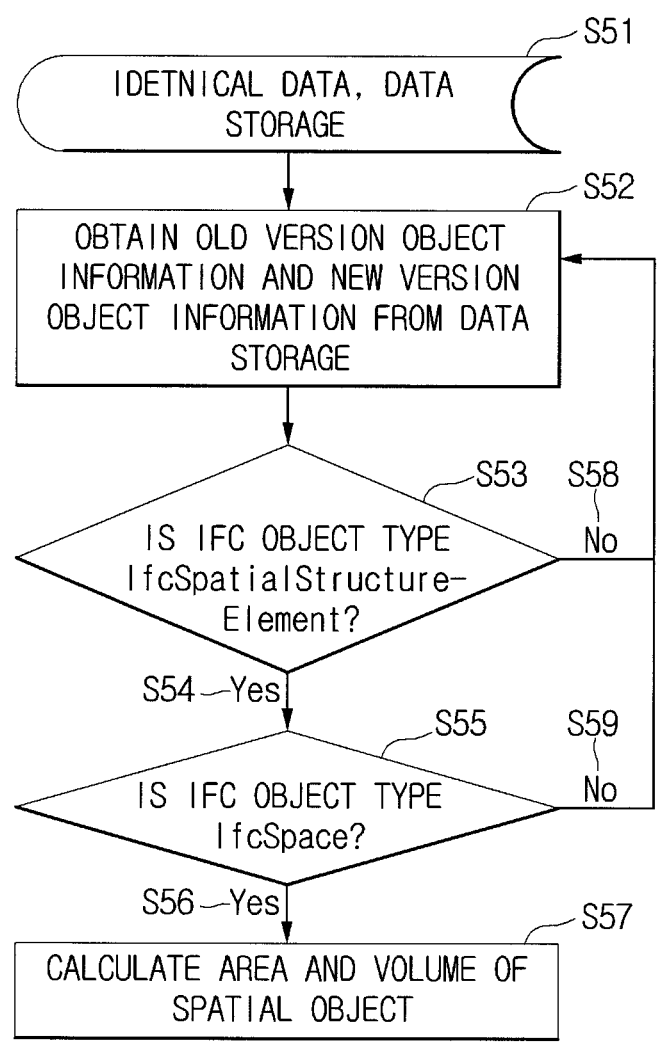
FIG. 6 is a view illustrating an exemplary embodiment of the information processing method of a spatial object checking engine of the present invention.

First, the identification of spatial objects will be described. If there is no change in the GUIDs, spatial objects are identified in the second phase. Here, not only the change in the location of the spatial object but also the change in the area and volume thereof are checked in order to check whether the spatial object has changed. FIG. 6 illustrates a preliminary step for identifying the spatial object, and whether the object corresponding to IfcSpace of IfcSpatialStructureElement exists in the IFC file is checked at this step. As shown in FIG. 6, the spatial object checking engine 1210 of the present invention obtains object information in the old version of the IFC file and the new version of the IFC file from the data storage at step S52, and checks whether the type of the IFC object is IfcSpatialStructureElement at step S53. If the IFC object type is IfcSpatialStructureElement (S54), whether the subtype of the IFC object is IfcSpace is checked at step S55. If the subtype of the IFC object is IfcSpace (S56), the area and volume of the spatial object are calculated at step S57. As a result of step S53, if the IFC object type is not IfcSpatialStructureElement (S58), the control flow moves to step S52. Also, as a result of step S55, if the subtype is not IfcSpace, the control flow moves to step S52. The spatial object checking engine 1210 performs calculation of the area and volume of the objects that are spatial objects.

Figure 7:
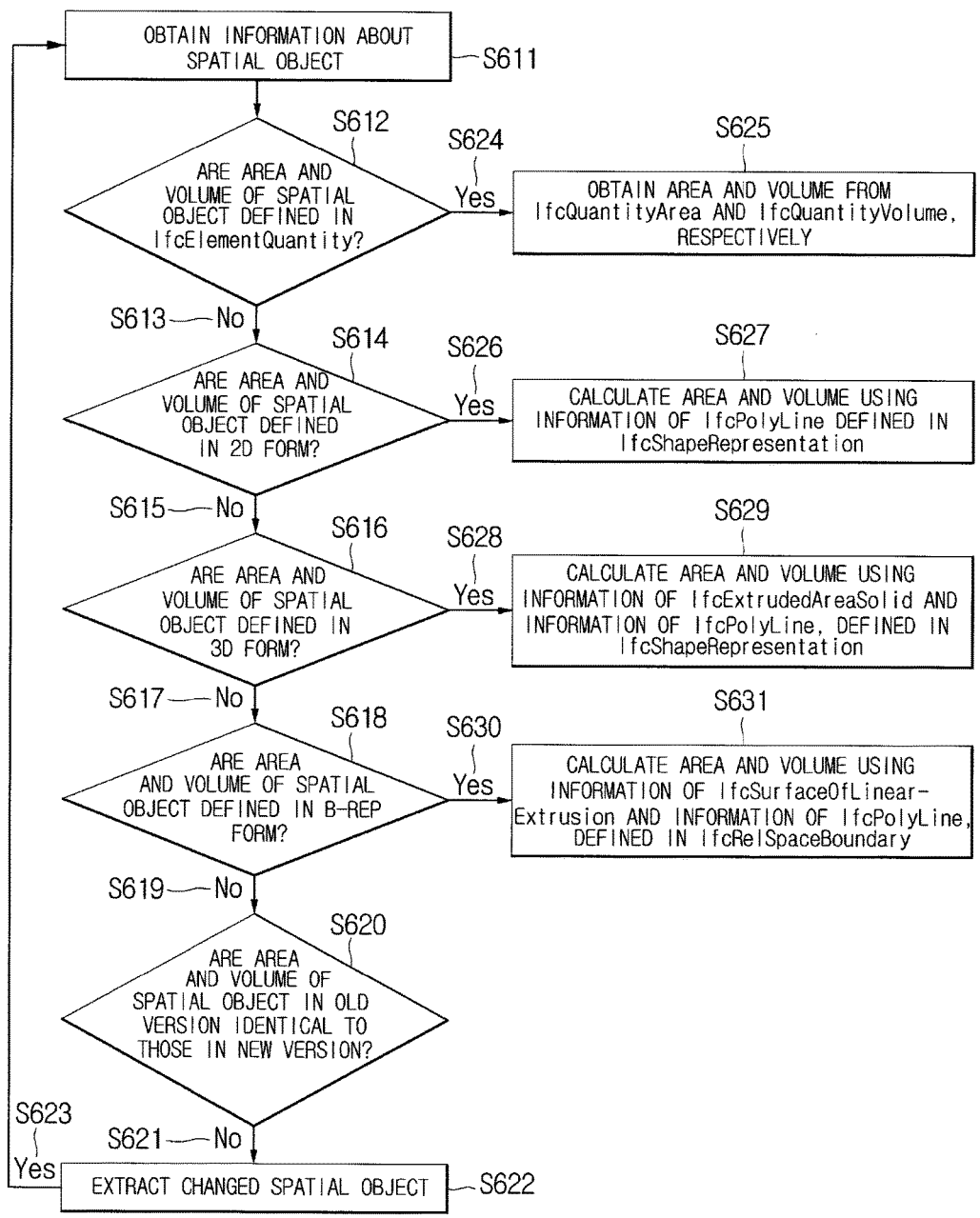
FIG. 7 is a view illustrating an exemplary embodiment of the information processing method of an area-volume comparison engine of the present invention.

Next, the function of the area-volume comparison engine 1220 of the present invention is described with reference to FIG. 7.

The area-volume comparison engine 1220 obtains information about the spatial object, which is extracted through the process of FIG. 6, at step S611, checks whether the area and volume of the spatial object are defined in IfcElementQuantity at step S612, and respectively obtains the area and volume from IfcQuantityArea and IfcQuantityVolume at step S625 if the area and volume are defined in IfcElementQuantity (S624). If the area and volume are not defined in IfcElementQuantity (S613), whether the area and volume of the object are defined as a 2D form is checked at step S614. If the area and volume of the object are defined as a 2D form (S626), the area and volume are calculated using information of IfcPolyLine, defined in IfcShapeRepresentation, at step S627. If the area and volume of the object are not defined as a 2D form (S615), whether the area and volume of the spatial object are defined as a 3D form is checked at step S616. As a result of step S616, if the area and volume of the spatial object are defined as a 3D form (S628), the area and volume are calculated using information of IfcExtrudedAreaSolid and IfcPolyLine, defined in IfcShapeRepresentation, at step S629. As the result of step S616, if the area and volume of the spatial object are not defined as a 3D form (S617), whether the area and volume of the spatial object are defined as B-REP form is checked at step S618. If the area and volume of the spatial object are defined as B-REP form (S630), the area and volume are calculated using information of IfcSurfaceOfLinearExtrusion and IfcPolyLine, defined in IfcRelSpaceBoundary, at step S631. As the result of step S618, if the area and volume of the spatial object are not defined as B-REP form (S619), whether the area or volume of the spatial object in the old version of the IFC file is the same as the area or volume of the spatial object in the new version of the IFC file is checked at step S620. If so, the control flow moves to step S611, new spatial object information is obtained, and information processing is performed. If the area or volume of the spatial object in the old version of the IFC file is not the same as the area or volume of the spatial object in the new version of the IFC file (S621), the changed spatial object is extracted at step S622.

For the spatial objects in the old version of the IFC file and the new version of the IFC file that have the same GUID, the area-volume comparison engine 1220 checks whether the area or volume of the spatial object has changed. If the area or volume has changed, the area-volume comparison engine generates information about the change (the GUID, the name of the spatial object, the area or volume of the spatial object in the old version, the area or volume of the spatial object in the new version, and the like).

Figure 8:
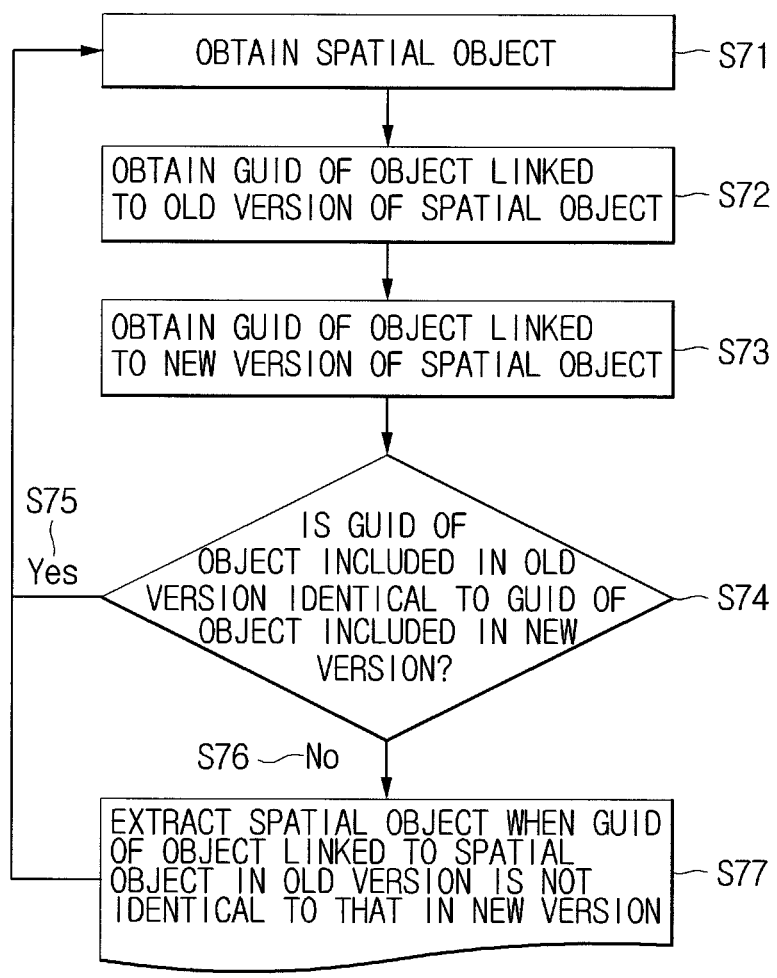
FIG. 8 is a view illustrating an exemplary embodiment of the information processing method of a relationship comparison engine of the present invention.

Next, the information processing method of the relationship comparison engine 1230 of the present invention will be described with reference to FIG. 8. If there is no change in the area and volume between the two IFC files having the different versions, the relationship of the spatial objects is checked as the next phase. In this context, space may be related to objects such as a wall, a door, a window, and the like, and whether the file is changed is examined by checking these relationships.

The relationship comparison engine 1230 obtains a spatial object corresponding to a GUID at step S71, obtains a GUID set (or object name set) of objects that are linked to the relevant spatial object in the old version of the IFC file at step S72, and obtains a GUID set (or object name set) of objects linked to the relevant spatial object in the new version of the IFC file at step S73. The relationship comparison engine compares whether the two GUID sets (or object name sets) are the same at step S74. If the two GUID sets (or object name sets) are the same (S75), another spatial object is obtained at step S71 and the information processing processes after the step are performed. If the two GUID sets are not the same (S76), the spatial object linked to the corresponding GUID set (or object name set) is extracted at step S77, and comparison information for the spatial object (for example, the spatial object, the GUID, the GUID set or the object names linked to the spatial object in the old version of the IFC file, the GUID set or the object names linked to the spatial object in the new version of the IFC file, and the like) is generated.

In the above Table 1 and 2, the objects related to GUID-07 are IfcDoor, IfcWindows, and IfcWallStandardcase in the old version of the IFC file, whereas the objects related to GUID-07 are IfcDoor and IfcWallStandardcase in the new version of the IFC file. Accordingly, it is confirmed that the relationship with the IfcWindows object has been deleted.

Figure 9:
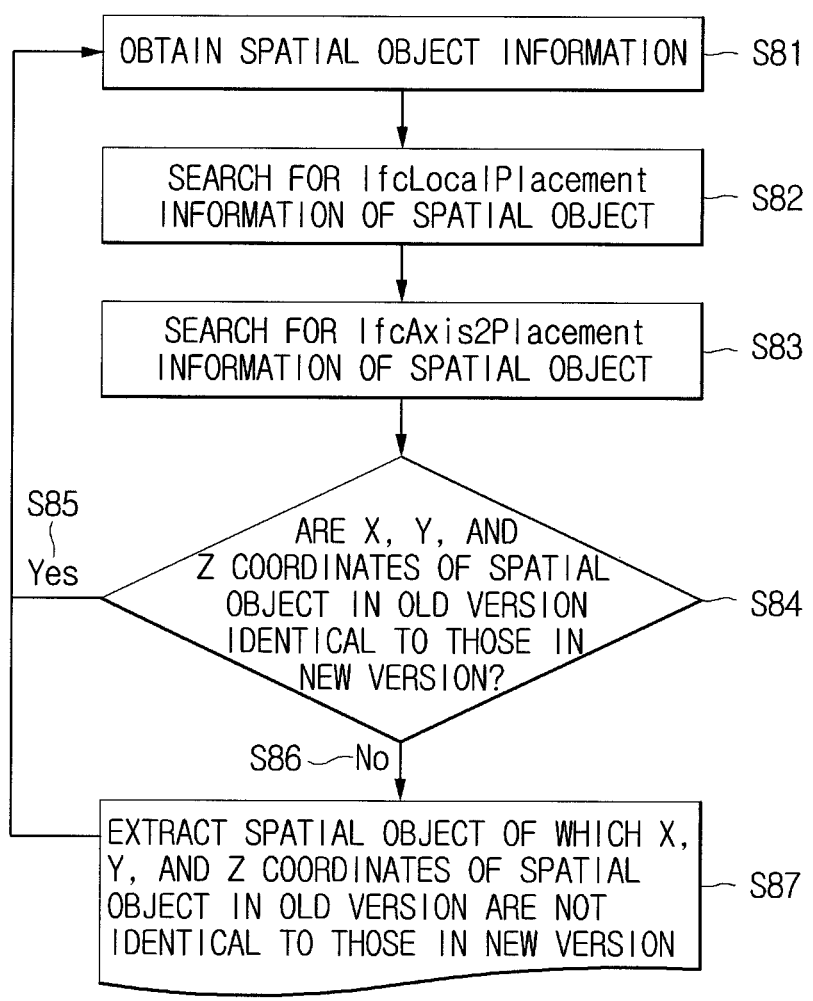
FIG. 9 is a view illustrating an exemplary embodiment of the information processing method of a location comparison engine of the present invention.

Next, referring to FIG. 9, the information processing method of the location comparison engine 1240 of the present invention is described. This process corresponds to the last phase, and when the change is not found through the above processes, the information about the location of the spatial objects of the IFC files having different versions is compared and checked to determine whether a change has been made.

The location comparison engine 1240 obtains spatial object information at step S81, searches for IfcLocalPlacement information of the spatial object at step S82, and checks whether the X, Y, and Z coordinates (or the set of the coordinates) of the spatial object of the old version of the IFC file are the same as those of the new version of the IFC file at step S84 by searching for IfcAxis2Placement information of the object. If the X, Y, and Z coordinates (or the set of the coordinates) of the spatial object of the old version of the IFC file are not the same as those of the new version of the IFC file (S86), the spatial object is extracted at step S87, and comparison information (the spatial object, the GUID, the X, Y, and Z coordinates (or the set of the coordinates) of the spatial object in the old version of the IFC file, and the X, Y, and Z coordinates (or the set of the coordinates) of the spatial object in the new version of the IFC file, and the like) is generated for the spatial objects for which the location information has changed. As a result of step S84, if the X, Y, and Z coordinates (or the set of the coordinates) of the spatial object in the old version of the IFC file are the same as those of the new version of the IFC file (S85), another spatial object is obtained at step S81, and the information processing processes after the step are performed.

Through the information processing processes described above, the spatial object comparison engine 1200 may generate comparison information as seen in the following Table 6 for the spatial object of GUID-07.

TABLE 6

| Spatial Object Index | Spatial Object GUID | Comparison | | | |
|---|---|---|---|---|---|
| | | area | Volume | location | relationship | Result |
| 4 | GUID-07 | same | Same | same | Changed | Changed object |

Figure 11:
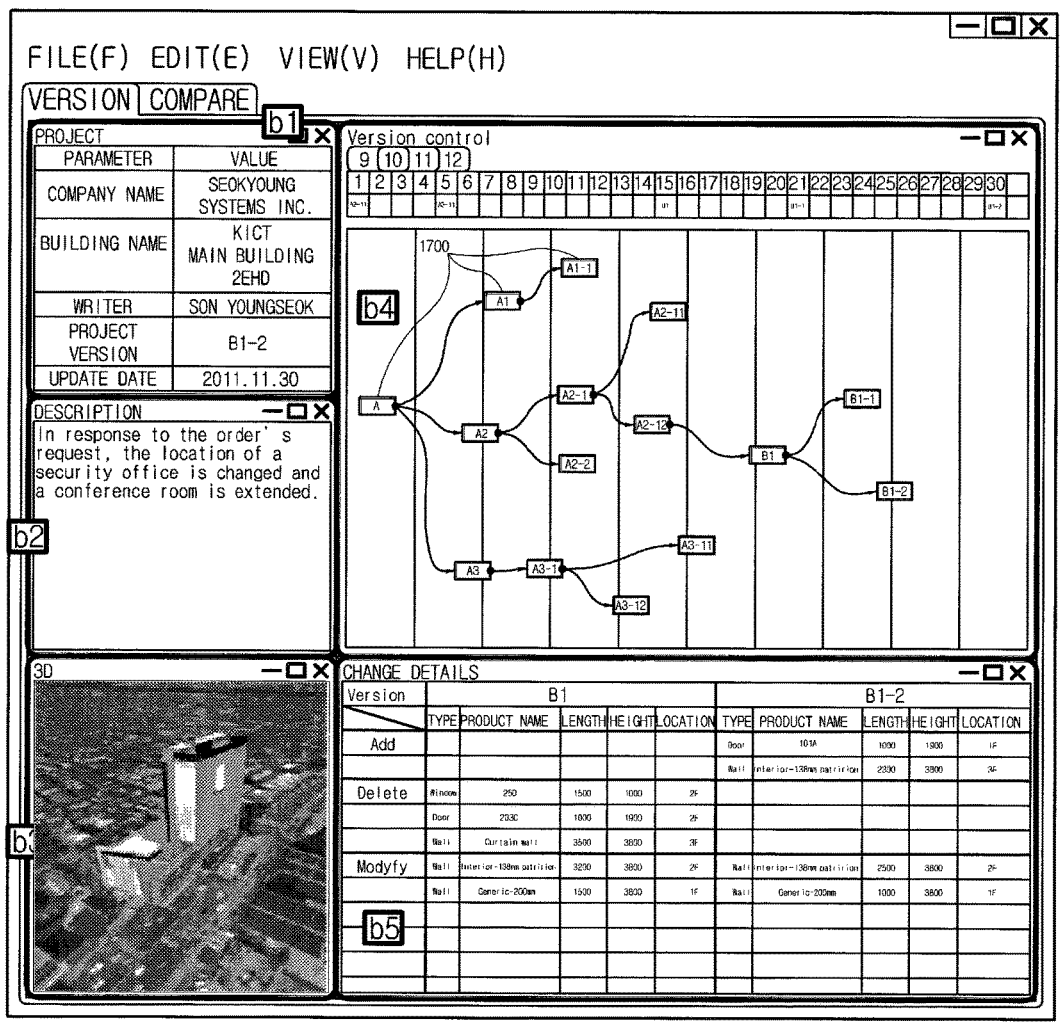
FIG. 11 is a view illustrating an exemplary embodiment of comparison information generated by a comparison information output unit of the present invention.

Subsequently, the information processing method of the comparison information output unit 1400 of the IFC version management system 1000 of the present invention is described with reference to the drawings. FIG. 11 shows an embodiment of the method for outputting comparison information generated by the comparison information output unit 1400 of the present invention. As shown in FIG. 11, the output of the comparison information largely includes five boxes. Each of the boxes is as follows.

(1) project box (b1)—when one version is selected in the version control window, this box shows project information for the selected version, including the updated date, the writer, and the like. (2) description box (b2)—when one version is selected in the version control window, this box enables writing the description about the selected version. A user may directly input the description about which part is updated compared to the previous version.

(3) 3D box (b3)—when one version is selected in the version control window, this box shows the whole 3D view of the selected version. (4) version control box (b4)—this box shows the flowchart and relationship chart of project versions according to date. (5) change details box (b5)—when one version is selected in the version control window, this box shows the changes between the selected version and the version previous to the selected version. The change details box (b5) of FIG. 11 represents information (the type, the product name, the length, the height, and the location) about the added, deleted, and modified objects for the IFC file version B1 and the IFC file version B1-2.

The following Table 7 exemplifies the content of the change details box illustrated in FIG. 11. B1 and B1-2 respectively correspond to the old version of the IFC file and the new version of the IFC file, which are the comparison targets.

TABLE 7

| | version | | | | | | | | | |
|---|---|---|---|---|---|---|---|---|---|---|
| | B1 | | | | | B2 | | | | |
| | type | Product name | length | Height | location | type | Product name | length | height | loation |
| Add | | | | | | Door | 101A | 1000 | 1900 | 1F |
| | | | | | | Wall | Interior-138 mm Partition | 2300 | 3800 | 3F |

TABLE 7-continued

| | | B1 | | | | | B2 | | | |
|---|---|---|---|---|---|---|---|---|---|---|
| | type | Product name | length | Height | location | type | Product name | length | height | loation |
| Delete | Window | 25D | 1500 | 1000 | 2F | | | | | |
| | Door | 203C | 1000 | 1900 | 2F | | | | | |
| | Wall | Curtain Wall | 3500 | 3800 | 3F | | | | | |
| Modify | Wall | Interior-138 mm Partition | 3200 | 3800 | 2F | Wall | Interior-138 mm Partition | 2500 | 3800 | 2F |
| | Wall | Generic-200 mm | 1500 | 3800 | 1F | Wall | Generic-200 mm | 1000 | 3800 | 1F |

FIG. 20 shows an example of comparison information generated by the comparison information output unit 1400 of the present invention. The output of the comparison information, exemplified in FIG. 20, comprises four boxes (C1 to C4), and the boxes are as follows. (1) Add box (C1)—this box shows added items by searching for the GUID of the elements. (2) Delete box (C2)—this box shows deleted items by searching for the GUID of the elements. (3) Modify box (C3)—this box shows the modified items by checking the length, height, and the like of the elements.

(4) 3D box (C4)—When one element is clicked in the Add, Delete, or Modify box, this box shows a 3D view for the selected element. The (4) 3D box displays the content of the IFC file in 3-dimensional form. Because the 3-dimensional visualization of IFC data is generally understood in the art of the present invention, a detailed description thereof will be omitted. However, the (4) 3D area of the present invention includes an additional function for processing the added, deleted, or modified object to be visually distinguished from other objects (for example, by highlighting the corresponding object) to enable intuitively detecting the information about the added, deleted, or modified object. Because the function for highlighting a specific object is included in the conventional art, a description of the detailed processing method is omitted.

MODE FOR INVENTION

Figure 10:
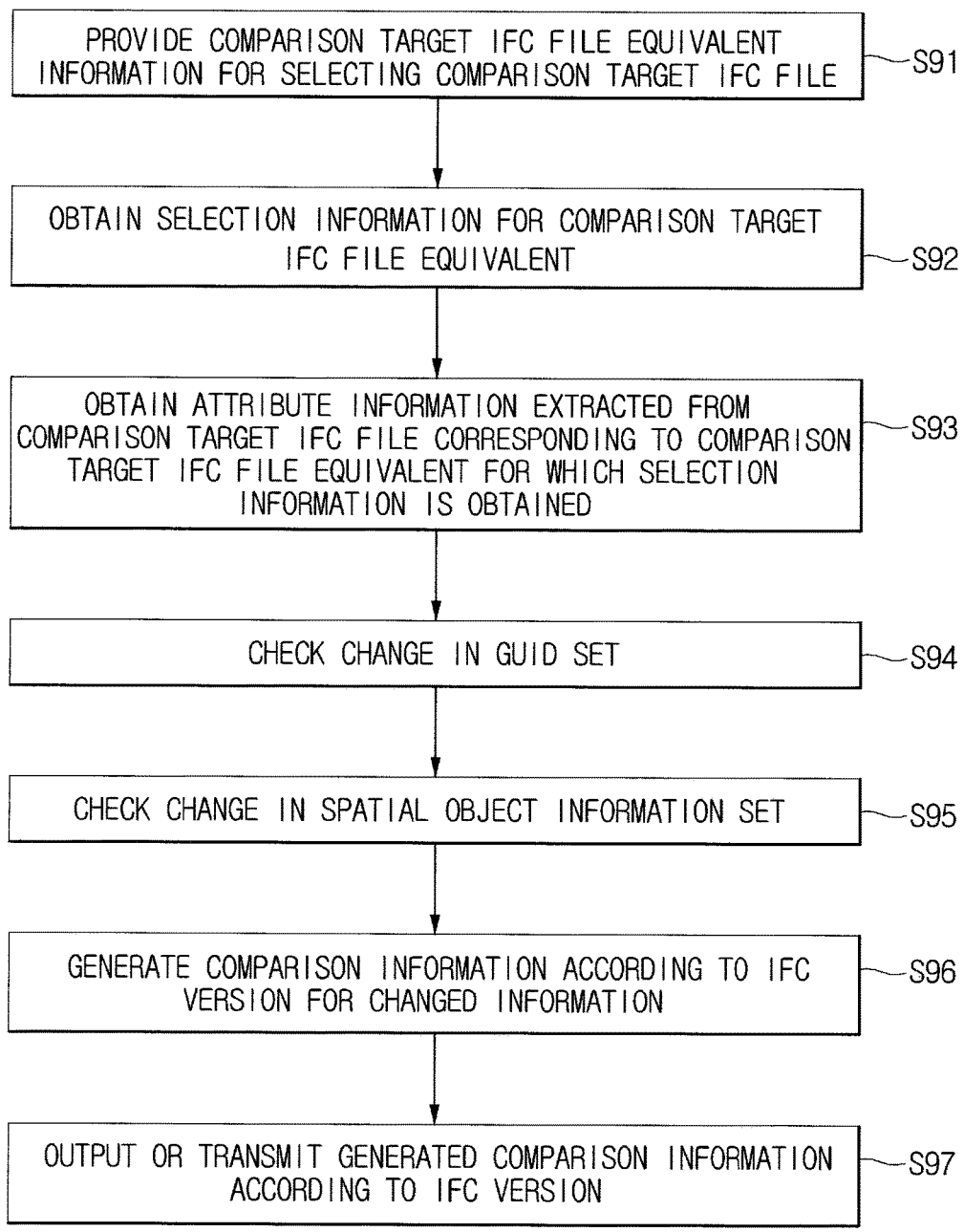
FIG. 10 is a view illustrating another exemplary embodiment of the information processing method of an IFC version management system of the present invention.

Subsequently, the information processing method of the IFC version management system 1000, related to a user and the UI for using the IFC version management system 1000 of the present invention, will be described in detail with reference to the drawings including FIG. 10.

Figure 12:
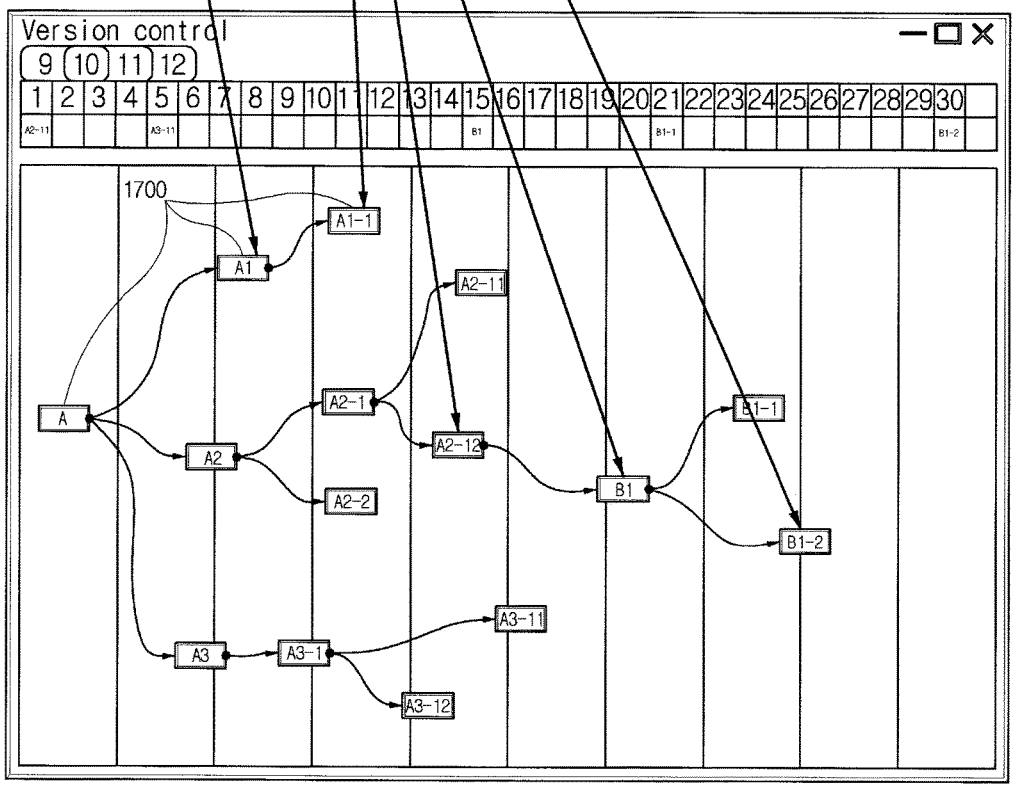
FIG. 12 is a view illustrating an exemplary embodiment of the configuration that shows the mapping relationship between revision information of an IFC file and an equivalent of the IFC file in the present invention.

The comparison target transmission unit 1311 of the comparison target obtaining unit 1310 of the present invention provides a user system with information about the comparison target IFC file equivalents in order to designate the IFC file to be compared at step S91. An example of the information about the comparison target IFC file equivalents to be transmitted to the user system is shown in FIG. 13. A, A1, A1-1, B1, B1-2, and the like, shown in FIG. 13, correspond to the different versions of the IFC file. These items, which correspond to the different versions of the IFC file, are called IFC file equivalents, and the information about the IFC file equivalents is called IFC file equivalent information. In other words, there is a one-to-one correspondence between A, A1, A1-1, B1, B1-2, etc., and the different versions of IFC files. FIG. 12 shows an example of this relationship. An example of the revision structure of the IFC file may comprise Release-ID, Branch-no, Part-no, and Parent-no, as shown in FIG. 12. As shown in FIG. 13, it is desirable that the IFC file equivalent information be displayed according to the time sequence.

For comparison target IFC file equivalent information, which is transmitted to the user system as shown in FIG. 13, the designated target obtaining unit 1312 of the IFC version management system 1000 obtains information about the selection of the comparison target IFC file equivalents from the user system at step S92. For example, the user of the user system may select B1 and B1-2. In this case, it is desirable that the IFC version management system 1000 display B1 and B1-2 in the comparison target IFC file equivalent information only when IFC files corresponding to B1 and B1-2 exist, or only when information extracted from the relevant IFC files exists. In other words, it is desirable that the comparison target IFC file equivalent information displayed in the user system be included the information owned by the user system.

The comparison target attribute obtaining unit 1320 obtains attribute information extracted from the comparison target IFC file corresponding to the selected comparison target IFC file equivalents at step S93. When the IFC attribute information corresponding to the selected IFC file equivalents exists in the extracted IFC attribute DB unit 1520, the comparison target processing unit 1300 obtains the IFC attribute information from the extracted IFC attribute DB unit 1520, and may perform steps after step S94. On the other hand, when no the IFC attribute information corresponding to the selected IFC file equivalents exists in the IFC extraction attribute DB unit 1520, the comparison target processing unit 1300 makes the IFC file attribute extracting unit 1330 extract necessary IFC attribute information from the IFC file (through the processes of storing the extracted IFC attribute information in the extracted IFC attribute DB unit 1520 and using the stored IFC attribute information). Then, steps after step S94 may be performed.

Next, the GUID comparison engine 1100 checks whether there is a change in the GUID set at step S94, and the spatial object comparison engine 1200 checks whether there is a change in the spatial object information set at step S95. Subsequently, the comparison information output unit 1400 generates comparison information according to the IFC version for the changes at step S96, and outputs or transmits the generated comparison information according to the IFC version at step S97.

Figure 14:
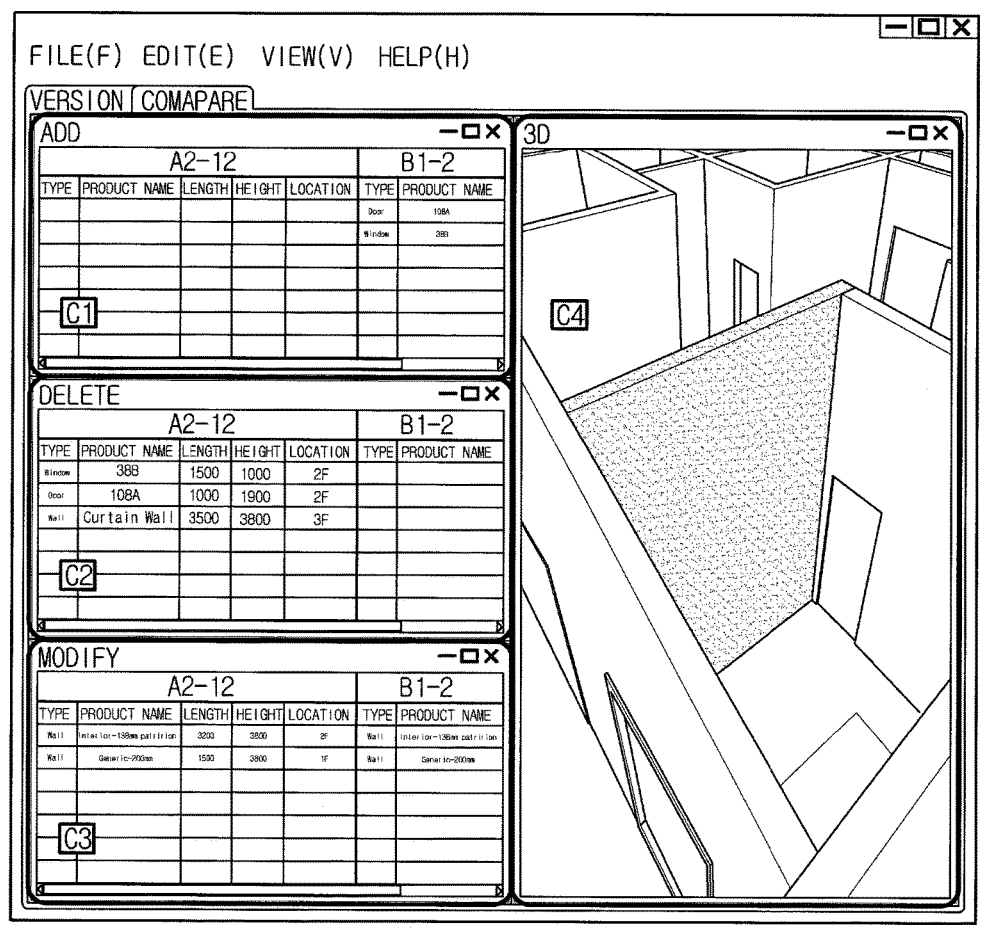
FIG. 14 is a view illustrating another exemplary embodiment of comparison information generated by a comparison information output unit of an IFC version management system of the present invention.

FIG. 14 illustrates an embodiment of the comparison information output by the comparison information output unit 1400. As shown in FIG. 14, for the IFC file version A2-12 and the IFC file version B1-2, the comparison information is displayed according to the type of change to the comparison target, such as Add, Delete, and/or Modify. In the 3D box (C4), when the wall in which the change occurs is clicked, the selected wall is displayed in a highlighted form (marked with diagonal lines).

The IFC version management system 1000 may be applied by being installed in BIM servers or systems, which process BIM information. Also, one or more BIM servers and systems are regarded as the user system of the present invention, and the IFC version management system may process information by being interconnected with the BIM servers or systems, or by transmitting and receiving information with the BIM servers or systems.

INDUSTRIAL APPLICABILITY

The present invention may be widely used in the construction industry.

The invention claimed is:

1. An information processing method of an Industry Foundation Classes (IFC) version management system, comprising:
(A) obtaining first IFC file attribute information related to a first IFC file and second IFC file attribute information related to at least one second IFC file;
(B) checking a change in a Globally Unique Identifier (GUID) set comprising GUID information included in the first IFC file and the second IFC file;
(C) checking a change in a spatial object Information set comprising at least one piece of spatial object information included in the first IFC file and the second IFC file,
(F) generating comparison information Indicating a change in any one of an area, a volume, a relationship, and a location of a spatial object and dissolving the comparison information on a screen,
wherein step (C) comprises checking a change in any one or more of an area and a volume of a spatial object, for at least one first IFC file spatial object included in the first IFC file and at least one second IFC file spatial object included in the second IFC file, wherein the change is checked between the first IFC file spatial object and the second IFC file spatial object when the GUID of the first IFC file spatial object is identical to the GUID of the second IFC file spatial object,
wherein whether IfcSpace exists in IfcSpatialStructureElement, corresponding to the first IFC file spatial object and the second IFC file spatial object, is checked, and the area or volume of the spatial object is calculated only when IfcSpace exists in the IfcSpatialStructureElement,
wherein, for each of the first IFC file spatial object and the second IFC file spatial object, if the area and volume of the spatial object are defined in IfcElementQuantity, the area is obtained from IfcQuantityArea and the volume is obtained from IfcQuantityVolume, and if not, the area and volume are calculated depending on whether the spatial object has a 2D form or a 3D form.

2. The information processing method of claim 1, wherein, for a first IFC file GUID set comprising GUIDs included in the first IFC file and a second IFC file GUID set comprising GUIDs included in the second IFC file,
step (B) is configured to extract a GUID, which is not included in the second IFC file GUID set but in the first IFC file GUID set, or to extract a GUID, which is not included in the first IFC file GUID set but in the second IFC file GUID set.

3. The information processing method of claim 1, wherein step (C) comprises checking a change in a relationship of a spatial object, for at least one first IFC file spatial object included in the first IFC file and at least one second IFC file spatial object included in the second IFC file,
wherein the change is checked between the first IFC file spatial object and the second IFC file spatial object when the GUID of the first IFC file spatial object is identical to the GUID of the second IFC file spatial object.

4. The information processing method of claim 3, wherein checking the change in the relationship of the spatial object comprises obtaining at least one first related object set, related to the first IFC file spatial object, obtaining at least one second related object set, related to the second IFC file spatial object, and comparing whether the first related object set is identical to the second related object set.

5. The information processing method of claim 4, wherein a first related object of the first related object set is an object included in relationship information of the first IFC file spatial object, and a second related object of the second related object set is an object included in relationship information of the second IFC file spatial object.

6. The information processing method of claim 3, wherein checking the change in the relationship of the spatial object comprises obtaining at least one first related object, related to the first IFC file spatial object, obtaining at least one second related object, related to the second IFC file spatial object, and comparing whether an attribute of the first related object is identical to an attribute of the second related object.

7. The information processing method of claim 1, wherein step (C) comprises checking a change in a location of a spatial object, for at least one first IFC file spatial object included in the first IFC file and at least one second IFC file spatial object Included in the second IFC file,
wherein the change is checked between the first IFC file spatial object and the second IFC file spatial object when the GUID of the first IFC file spatial object is identical to the GUID of the second IFC file spatial object.

8. The information processing method of claim 7, wherein whether X, Y, and Z coordinates of the first IFC file spatial object are identical to X, Y, and Z coordinates of the second IFC file spatial object is determined by checking IfcLocalplacement and ifcAxis2Placement of the first IFC file spatial object and the second IFC file spatial object.

9. The information processing method of claim 1, wherein the first IFC file attribute Information is generated by extracting attribute Information, which is distinguished from graphic data, from the first IFC file, and
the second IFC file attribute information is generated by extracting attribute Information, which is distinguished from graphic data, from the second IFC file.

10. The information processing method of claim 1, further comprising, before step (A),
(D) obtaining both information about a selection of the first IFC file or an equivalent of the first IFC file and information about a selection of the second IFC file or an equivalent of the second IFC file from a user of the IFC version management system.

11. The information processing method of claim 10, further comprising, before step (D),
(E) providing information about two or more of the IFC files or two or more of the equivalents of the IFC files to a terminal of the user of the IFC version management system, wherein the information about the two or more of the IFC files or the two or more of the equivalents of the IFC files is presented according to a time sequence.

12. The information processing method of claim 1, wherein when the spatial object has a 2D form, the area and volume are calculated using information of IfcPoyLine defined in IfcShapeRepresentation, and when the spatial object has a 3D form, the area and volume are calculated using Information of IfcExtrudedAreaSolid and information of ifcPolyLine, defined in ifcShapeRepresentation.

13. The Information processing method of claim 1, wherein when the area and volume of the spatial object are not defined in IfcElementQuantity and the spatial object has neither a 2D form nor a 3D form and when the area and volume of the spatial object are defined in B-REP form, the area and volume are calculated using information of IfcSurfaceOflinearExtrusion and Information of IfcPolyLine, defined in IfcRelSpaceBoundary.

14. The Information processing method of claim 1, wherein in step (C), for at least one first IFC file spatial object included in the first IFC file and at least one second IFC file spatial object included in the second IFC file, checking a change in any one or more of an area and volume of the spatial object, checking a change in a relationship of the spatial object, and checking a change in a location of the spatial object are sequentially performed, wherein all the changes are checked between the first IFC file spatial object and the second IFC file spatial object when the GUID of the first IFC file spatial object is identical to the GUID of the second IFC file spatial object.

15. The information processing method of claim 1, wherein step (A) is configured to perform any one or more of a first IFC file attribute information obtaining method and a second IFC file attribute information obtaining method, the first IFC file attribute information obtaining method obtaining attribute information directly from the first IFC file and the second IFC file, and the second IFC file attribute information obtaining method obtaining the attribute information from an attribute information DB In which the attribute information extracted from the first IFC file and the second IFC file is stored.

16. The information processing method of claim 1, wherein when a number of IFC files having different versions, processed by the IFC version management system, is n (where n is an integer equal to or greater than 2), a past IFC file becomes the first IFC file based on an IFC file generation date and a remaining IFC file becomes the second IFC file, among two IFC files having different versions, which are selected from among n files, and step (A), (B), and (C) are performed for respective cases of $_nC_2$ combinations for selecting two files from among n files.

17. An Industry Foundation Classes (IFC) version management system, comprising:

a computer processor; and a memory for storing computer executable instructions that when executed by the processor, cause the processor to implement:

a comparison target processor for receiving first IFC file attribute information related to a first IFC file and second IFC file attribute information related to at least one second IFC file;

a Globally Unique Identifier (GUID) comparison engine for comparing a first IFC file GUID set comprising first IFC file GUIDs of first IFC file attributes with a second IFC file GUID set comprising second IFC file GUIDs of second IFC file attributes, the first IFC file attributes and the second IFC file attributes being received by the comparison target processing unit;

a spatial object comparison engine for comparing a first IFC file spatial object information set comprising information of a first IFC file spatial object of the first IFC file attributes with a second IFC file spatial object information set comprising information of a second file spatial object of the second IFC file attributes, the first IFC file attributes and the second IFC file attributes being obtained by the comparison target processing unit, and a comparison information output unit for generating comparison information indicating a change in any one among an area, a volume, a relationship, and a location of a spatial object, and to transmit the generated comparison information to a user system which displays the comparison information, wherein the spatial object comparison engine comprises a spatial object checking engine which checks whether IfcSpace exists in IfcSpatialStructureElement corresponding to the first IFC file spatial object and the second IFC file spatial object, and information processing of the spatial object checking engine is performed for the first IFC file spatial object and the second IFC file spatial object only when IfcSpace exists in the IfcSpatialStructureElement, wherein the spatial object comparison engine comprises an area-volume comparison engine, and for each of the first IFC file spatial object and the second IFC file spatial object, the area-volume comparison engine respectively obtains an area and a volume from ifcQuantitvArea and ifcQuantitvVolume if the area and volume of the spatial object are defined in ifcElementQuantity, and calculates the area and volume depending on whether the spatial object has a 2D form or a 3D form if the area and volume of the spatial object are not defined in IfcElementQuantity.

18. The IFC version management system of claim 17, wherein the GUID comparison engine extracts a GUID, which is not included in the second IFC file GUID set but in the first IFC file GUID set, or extracts a GUID, which is not included in the first IFC file GUID set but in the second IFC file GUID set.

19. The IFC version management system of claim 17, wherein the spatial object comparison engine comprises an area-volume comparison engine, and for one or more of the first IFC file spatial objects and the second IFC file spatial objects, of which the GUIDs are the same, the area-volume comparison engine compares whether an area or volume in the first IFC file is identical to an area or volume in the second IFC file.

20. The IFC version management system of claim 17, wherein the spatial object comparison engine comprises a relationship comparison engine, and for one or more of the first IFC file spatial objects and the second IFC file spatial objects, of which the GUIDs are the same, the relationship comparison engine compares whether an object set related to the first IFC file spatial object is identical to an object set related to the second IFC file spatial object.

21. The IFC version management system of claim 20, wherein checking a change in the relationship of the spatial object comprises obtaining at least one first related object set, related to the first IFC file spatial object, obtaining at least one second related object set, related to the second IFC file spatial object, and comparing whether the first related object set is identical to the second related object set.

22. The IFC version management system of claim 21, wherein a first related object of the first related object set is an object included in relationship information of the first IFC file spatial object, and a second related object of the second related object set is an object included in relationship information of the second IFC file spatial object.

23. The IFC version management system of claim 22, wherein whether X, Y, and Z coordinates of the first IFC file spatial object are identical to X, Y, and Z coordinates of the second IFC file spatial object is determined by checking IfcLocalplacement and IfcAxis2Placement of the first IFC file spatial object and the second IFC file spatial object.

24. The IFC version management system of claim 20, wherein the relationship comparison engine checks the change in the relationship of the spatial object through processes of obtaining at least one first related object, related to the first IFC file spatial object, obtaining at least one second related object, related to the second IFC file spatial object, and comparing whether an attribute of the first related object is identical to an attribute of the second related object.

25. The IFC version management system of claim 17, wherein the spatial object comparison engine comprises a location comparison engine, and
for one or more of the first IFC file spatial objects and the second IFC file spatial objects, of which the GUIDs are the same, the location comparison engine compares whether location information of the first IFC file spatial object is identical to location Information of the second IFC file spatial object.

26. The IFC version management system of claim 17, wherein the first IFC file attribute information is generated by extracting attribute information, which is distinguished from graphic data, from the first IFC file, and
the second IFC file attribute information is generated by extracting attribute Information, which is distinguished from graphic data, from the second IFC file.

27. The IFC version management system of claim 17, wherein the comparison target processing unit comprises a comparison target obtaining unit, and
the comparison target obtaining unit comprises a designated target obtaining unit for obtaining both information about a selection of the first IFC file or an equivalent of the first IFC file and information about a selection of the second IFC file or an equivalent of the second IFC file from a user of the IFC version management system.

28. The IFC version management system of claim 27, wherein the comparison target obtaining unit further comprises a comparison target transmission unit for providing information about two or more of the IFC files or two or more of the equivalents of the IFC files to a terminal of the user of the IFC version management system, and
the information about the two or more of the IFC files or the two or more of the equivalents of the IFC files is presented according to a time sequence.

29. The IFC version management system of claim 17, wherein when the spatial object has a 2D form, the area and volume are calculated using Information of IfcPolyLine defined in IfcShapeRepresentation, and
if the spatial object has a 3D form, the area and volume are calculated using information of IfcExtrudedAreaSolid and information of IfcPolyLine, defined in IfcShapeRepresentation.

30. The IFC version management system of claim 17, wherein when the area and volume of the spatial object are not defined in ifcElementQuantity and the spatial object has neither a 2D form nor a 3D form and when the area and volume of the spatial object are defined in B-REP form, the area and volume are calculated using Information of IfcSurfaceOflinearExtrusion and information of IfcPolyLine, defined in IfcRelSpaceBoundary.

31. The IFC version management system of claim 17, wherein, for at least one first IFC file spatial object included in the first IFC file and at least one second IFC file spatial object included in the second IFC file, the spatial object comparison engine sequentially performs checking a change in any one or more of an area and volume of the spatial object, checking a change in a relationship of the spatial object, and checking a change in a location of the spatial object,
wherein all the changes are checked between the first IFC file spatial object and the second IFC file spatial object when the GUID of the first IFC file spatial object is identical to the GUID of the second IFC file spatial object.

32. The IFC version management system of claim 17, wherein the comparison target processing unit obtains attribute information directly from the first IFC file and the second IFC file, or obtains the attribute information from an attribute information DB in which the attribute Information extracted from the first IFC file and the second IFC file is stored.

33. The IFC version management system of claim 17, wherein when a number of IFC files having different versions, processed by the IFC version management system, is n (where n is an integer equal to or greater than 2),
a past IFC file becomes the first IFC file based on an IFC file generation date and a remaining IFC file becomes the second IFC file, among two IFC files having different versions, selected from among n files, and
information processing of the GUID comparison engine and the spatial object comparison engine is performed for respective cases of $_nC_2$ combinations for selecting two files from among n files.

* * * * *